(12) United States Patent
Datta et al.

(10) Patent No.: US 7,938,407 B2
(45) Date of Patent: *May 10, 2011

(54) HIGH TEMPERATURE SPRING SEALS

(75) Inventors: Amitava Datta, East Greenwich, RI (US); Dominick G. More, Middletown, CT (US); Kenneth W. Cornett, Ivoryton, CT (US); Jeremy Payne, New Haven, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 614 days.

This patent is subject to a terminal disclaimer.

(21) Appl. No.: 11/977,041

(22) Filed: Oct. 23, 2007

(65) Prior Publication Data

US 2008/0106046 A1 May 8, 2008

Related U.S. Application Data

(63) Continuation-in-part of application No. 10/981,308, filed on Nov. 4, 2004, now Pat. No. 7,464,940.

(60) Provisional application No. 60/517,197, filed on Nov. 4, 2003, provisional application No. 60/865,668, filed on Nov. 14, 2006.

(51) Int. Cl.
*F16J 15/00* (2006.01)
*F16J 15/02* (2006.01)

(52) U.S. Cl. ........................ 277/644; 277/647

(58) Field of Classification Search .......... 277/471–472, 277/545, 553, 555, 581, 621, 438, 530, 567, 277/644, 647

See application file for complete search history.

(56) References Cited

U.S. PATENT DOCUMENTS

| 3,106,404 A | 10/1963 | Mongitore |
| 3,414,276 A * | 12/1968 | Faccou et al. ............... 277/363 |
| 3,524,636 A | 8/1970 | Copley et al. |
| 3,973,952 A | 8/1976 | Bieber et al. |
| 4,114,905 A | 9/1978 | Mercier |

(Continued)

FOREIGN PATENT DOCUMENTS

GB 2259119 A 3/1993

(Continued)

OTHER PUBLICATIONS

Advanced Gas Turbine Systems Research, Technical Quarterly Progress Report, Jul. 2001-Sep. 2007, South Carolina Institute for Energy Studies, 162 Pages.

*Primary Examiner* — Vishal Patel
(74) *Attorney, Agent, or Firm* — BainwoodHuang

(57) ABSTRACT

A spring seal for sealing in high temperature applications includes a jacket and a spring member disposed within the jacket. The spring member is constructed to control a sealing load or spring rate of the spring seal relative to opposing flanges while the jacket is constructed to provide a sealing surface relative to the opposing flanges. The spring member is manufactured from a cast blade alloy, thereby allowing the spring member to maintain its spring back characteristics at relatively high temperatures of about 1300° F. and greater. Accordingly, the spring member minimizes the formation of a leak path between the spring seal and the opposing flanges. In one embodiment, the spring member is manufactured with a substantially U-shaped cross-section. With such a configuration, the spring seal provides substantially balanced, opposing forces on the jacket to minimize the formation of gaps between the spring seal and the flanges.

13 Claims, 25 Drawing Sheets

U.S. PATENT DOCUMENTS

| | | | |
|---|---|---|---|
| 4,508,356 A | * | 4/1985 | Janian .......................... 277/555 |
| 4,585,239 A | * | 4/1986 | Nicholson ..................... 277/555 |
| 4,946,174 A | | 8/1990 | Usui |
| 5,630,591 A | | 5/1997 | Drijver et al. |
| 5,799,953 A | | 9/1998 | Henderson |
| 2004/0201180 A1 | | 10/2004 | Shah et al. |
| 2005/0206097 A1 | * | 9/2005 | Datta .......................... 277/644 |

FOREIGN PATENT DOCUMENTS

| | | |
|---|---|---|
| GB | 2378486 A | 2/2003 |

* cited by examiner

HIGH TEMPERATURE SPRING SEALS

CROSS REFERENCE TO RELATED APPLICATIONS

This patent application is a Continuation-in-Part of U.S. patent application Ser. No. 10/981,308 filed on Nov. 4, 2004, entitled, "HIGH TEMPERATURE SPRING SEALS" which claims the benefit of U.S. Provisional Application No. 60/517,197, filed Nov. 4, 2003. This patent application also claims the benefit of U.S. Provisional Application No. 60/865,668, filed Nov. 14, 2006. The entire contents of the above applications are incorporated herein by reference in entirety.

BACKGROUND

High temperature structural static seals are used in gas turbine engines and other equipment where high temperature fluids need to be sealed. These seals are traditionally made from cold formable or wrought superalloys. Conventional seals typically are made from superalloy sheet stock using a cold-forming procedure and can have different shaped cross sections. For example, some conventional cross-sections include the C (FIG. 1A), U (FIG. 1B) and E shapes (FIG. 1C), among other annular seals. These conventional annular seal rings are preferably installed between flanges, for example $F_1$, $F_2$ (FIG. 2), in a compressed condition.

The compression stress and the fluid pressure acting on these types of conventional annular seals provide sufficient sealing force to prevent the high pressure fluid from leaking through the interfaces where the seal and the flanges $F_1$, $F_2$ meet. At temperatures less than about 1300° F., as the flanges $F_1$, $F_2$ move back and forth, the elastic spring back of the seal cross-section maintains the sealing contact with the flange $F_1$, $F_2$, as best illustrated in FIG. 3.

SUMMARY

Conventional seals made from cold formable or wrought superalloys suffer from a variety of deficiencies. At high temperatures of greater than about 1300° F., conventional seals made of cold formable superalloys, such as alloy 718 Waspaloy and the like, have been found to stress relax because of coarsening and dissolution of the strengthening phase γ'. At high temperatures and when under compression, these conventional seals deform permanently to a compressed state and lose the ability of to elastically spring back and maintain a sealing contact with the flanges. Accordingly, and with reference to FIG. 3, conventional seals made from cold formable or wrought superalloys create a gap, "g" between the seal and the flange $F_2$ during the operating cycle of the engine. This creates a leak path through which the pressurized fluids can flow. The spring rate of conventional seals is controlled by the thickness and shape of seal cross-section as well as the yield strength, and elastic modulus of the cold formable alloys from which the seals are made.

In order to avoid permanent aforementioned failure of seal performance resulting from exposures at high temperatures, generally of greater than about 1300° F., it is known to keep the temperature of these seals from reaching such elevations. One manner in which conventional seals are cooled is by using bleed air from compressors of gas turbine engines. Although generally effective, the use of such bleed air is expensive and could be otherwise used for generating thrust or power. The use of cooling air, therefore, adversely affects the efficiency of gas turbine engines. A need exists for cost-effective high temperature structural seals which can maintain their sealing contacts at high temperatures of greater than about 1300° F. without the need of cooling air.

Similarly, a high temperature fastening device, using its spring action and holding two components with widely different thermal expansion coefficients, such as metallic and ceramic components, can lose its fastening capability at high temperatures. For example, lightly loaded annular spring devices 2 are necessary to attach a ceramic liner 4 to a metallic casing 6 of a combustor as shown in FIGS. 4A-4B. The ceramic liner 4 is not rigidly fastened to the metallic casing 6 using a bolted design because the bolt stresses generated by the differential thermal expansion of the metallic casing 6 and ceramic liner 4 can lead to failure of the brittle ceramic liner 4. Thus, a need also exists for a low load spring device which can operate at extremely high temperatures of greater than about 1300° F. and up to about 1800° F. These applications are generally in oxidizing environments and any such spring devices should also possess oxidation resistance.

In accordance with an embodiment of the invention, there is provided a seal for sealing in high temperature applications including an inner spring for controlling the sealing load or the spring rate, and an outer jacket for providing a sealing surface with one or more movable parts. The outer jacket is moveable by the inner spring in order to maintain a seal to prevent high pressure fluid from leaking through the interfaces where the seal and the flanges meet, particularly during high temperature applications (i.e., high temperatures of about 1300° F. and greater). The spring member has a spring rate that is greater than the spring rate of the jacket such that expansion of the spring member into contact with the jacket causes corresponding expansion of the jacket to maintain sealing between the outer surface of the jacket and the one or more movable parts. The spring member is manufactured from a cast blade alloy which maintains its spring back characteristics at high temperatures of about 1300° F. and greater.

In one embodiment, the inner spring includes a plurality of flexible fingers, which are inclined with respect to a longitudinal axis of the outer jacket having a continuous outer sealing surface. A transition ring may be provided between an inner surface of the jacket and the top sections of the one or more flexible fingers. In another embodiment, the inner spring is tubular including a plurality of inclined slots.

In one arrangement, a seal compressible between a pair of mating surfaces includes a jacket and a spring member disposed within the jacket. The spring member is manufactured from a cast blade alloy. The jacket is movable by the spring member to maintain a seal against at least one of the mating surfaces. With the spring member being manufactured from a cast blade alloy, the seal maintains its spring back characteristics at high temperatures of about 1300° F. and greater, thereby minimizing fluid leakage between the seal and the mating surfaces during high temperature operation.

In one arrangement, a seal compressible between a pair of mating surfaces includes a jacket having an outer periphery and an inner periphery and a spring member disposed within the jacket. The spring member includes a first support element inclined along a first direction relative to a longitudinal axis of the spring member and extending from the outer periphery of the jacket toward the inner periphery of the jacket and a second support element opposing the first support element, the second inclined along a second direction relative to the longitudinal axis of the spring member and extending from the outer periphery of the jacket toward the inner periphery of the jacket. The jacket is moveable by the first support element and the second support element to form a seal with at least one of the pair of mating surfaces. The spring member is manufactured from a cast blade alloy. The cast blade alloy is effective to cause at least one of the first support element and the second support element of the spring member to resist stress relaxation when the spring member is exposed to a temperature greater than about 1300° F. With such a configuration, the spring seal provides substantially balanced, opposing forces on the jacket to minimize the formation of gaps between the spring seal and the flanges.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DETAILED DESCRIPTION

Embodiments of the invention relate to a spring seal for sealing in high temperature applications. The spring seal includes a jacket and a spring member disposed within the jacket. The spring member is constructed and arranged to control a sealing load or spring rate of the spring seal relative to opposing flanges while the jacket is constructed and arranged to provide a sealing surface relative to the opposing flanges. The spring member is manufactured from a cast blade alloy, thereby allowing the spring member to maintain its spring back characteristics at relatively high temperatures of about 1300° F. and greater. Accordingly, the spring member minimizes the formation of a leak path between the spring seal and the opposing flanges. In one embodiment, the spring member is manufactured with a substantially U-shaped cross-section. With such a configuration, the spring seal provides substantially balanced, opposing forces on the jacket to minimize the formation of gaps between the spring seal and the flanges during operation.

Figure 5:
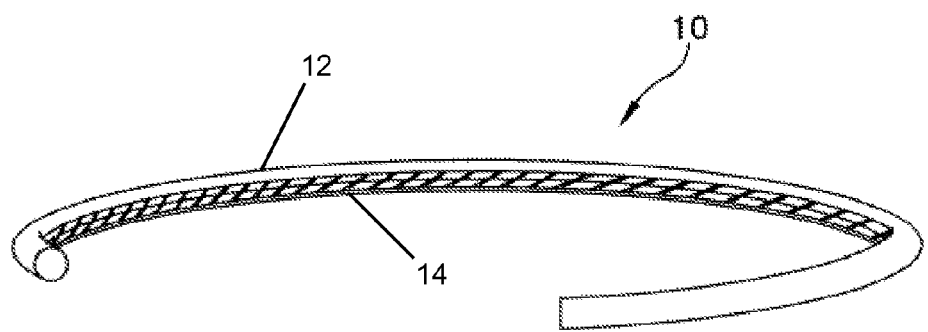
FIG. 5 is a perspective view of a seal for high temperature applications, the seal having a spring member.
Figure 6:
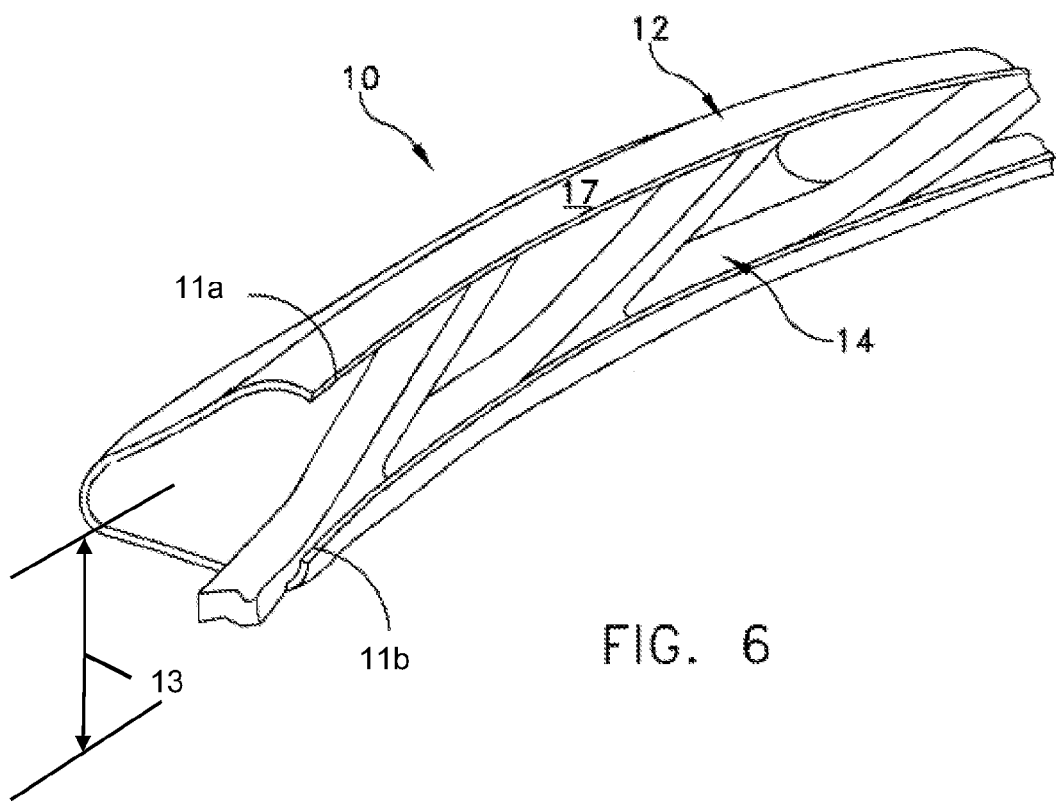
FIG. 6 is an enlarged view of a high temperature seal.

Referring now to FIGS. 5 and 6, a seal or spring seal 10 is disclosed which can be used as a seal in high temperature applications, for example in gas turbine engines operating at about 1300° F. and greater, and for use in other equipment where high temperature fluids need to be sealed. As used herein, the phrase "high temperature" refers to applications which may operate, at least part of the time, at temperatures of about 1300° F. and above. As also used herein, the term "fluid" refers to all forms of fluid, including gasses and liquids. The phrase "spring rate" is defined herein as the amount of force needed to compress a spring, or the like, a certain height, as is conventional. A first member having a lower spring rate than a second member means that less of a force is needed to compress the first member a certain distance as compared to the second member for the same distance.

The high temperature seal 10, according to the present embodiment, includes a spring member 14 which controls the sealing load or the spring rate and a jacket 12 which provides a sealing interface with opposing mating surfaces, such as flanges (not shown). The outer jacket 12 is moveable by the spring member 14 in order to maintain a seal with the opposing mating surfaces to minimize or prevent high pressure fluid from leaking through an interface where the jacket 12 and the mating surfaces meet, particularly during high temperature applications.

Figure 1A:
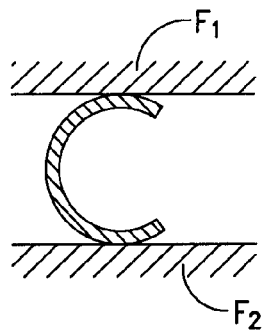
FIG. 1A is a cross-sectional view of a prior art "C" type shape seal ring compressed between flanges.
Figure 1B:
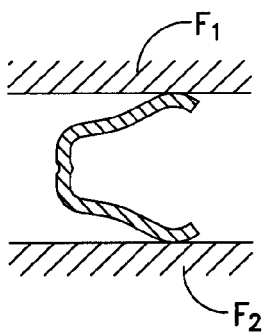
FIG. 1B is a cross-sectional view of a prior art "U" type shape seal ring compressed between flanges.
Figure 1C:
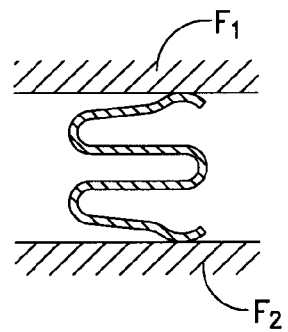
FIG. 1C is a cross-sectional view of a prior art "E" type shape seal ring compressed between flanges.
Figure 2:
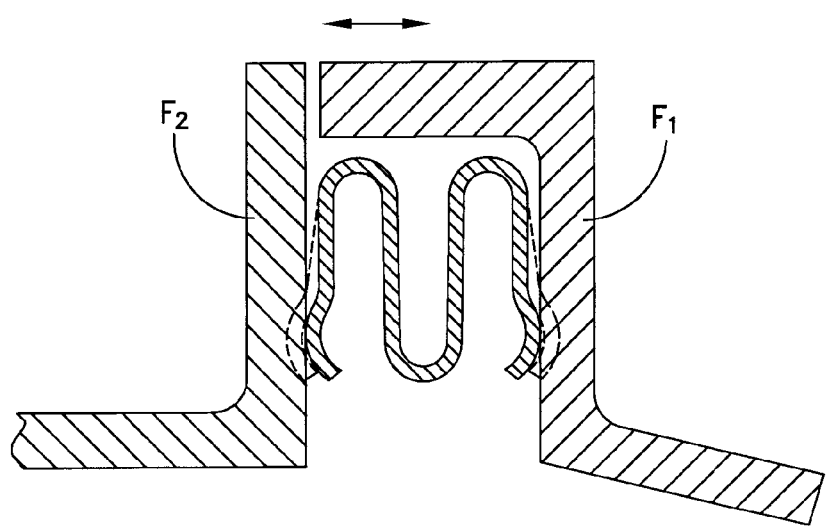
FIG. 2 is a schematic, cross-sectional view of the prior art seal of FIG. 1C during use.
Figure 3:
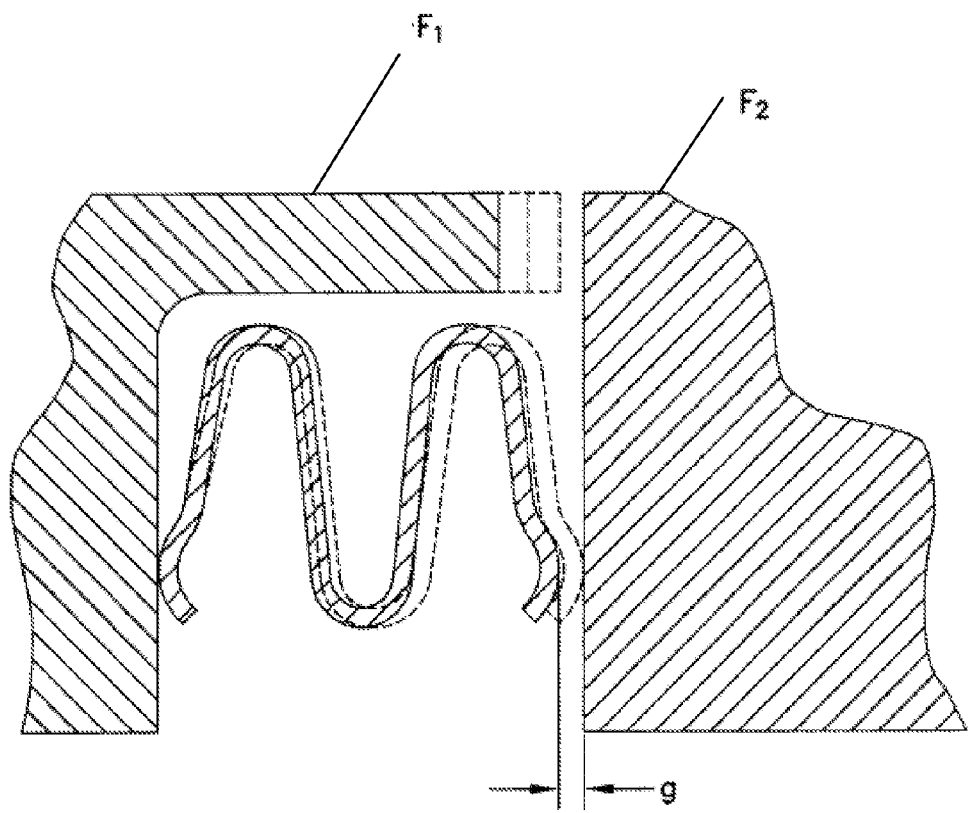
FIG. 3 is a schematic, cross-sectional view of FIG. 2 illustrating stress relaxation of the prior art seal ring at elevated temperatures.

As best shown in FIG. 6, the spring member 14 is disposed within the sealing jacket 12 which includes a continuous outer sealing surface 17 for forming a sealing interface with flanges (not shown). The jacket 12 may include a first and a second end 11a, 11b which may overlap, or which may be disposed at a distance from each other so as to form a gap 13 that provides access to the inner spring member 14. Accordingly, the jacket 12 may have a generally U-shaped cross-section as shown in FIG. 6, a generally C-shaped cross-section, or in the case of overlapping, an O-shaped cross-section. In one arrangement, the jacket 12 is made from any known oxidation resistant cold formable sheet metal sheet stock, for example Haynes 214 manufactured by Haynes International. Because the present embodiment includes the spring member 14, the jacket 12 does not need to provide the sealing force by acting as a spring as with prior art designs illustrated in FIGS. 1A-1C. Instead, the spring member 14 provides the sealing force sufficient to maintain the jacket 12 in sealing contact with opposing flanges during movement, even at high temperatures.

In order for the spring member 14 to operate at temperatures greater than about 1300° F., the spring member 14 is manufactured from a cast blade alloy, such as conventionally used for high temperature turbine blades. Cast blade alloys have certain material characteristics that make them more desirable for use in high temperature (e.g., greater than about 1300° F.) environments compared to cold formable or wrought superalloys (e.g., 718, Waspaloy manufactured by Special Metals and other such superalloys) utilized in prior art seals.

For example, the differences between the grain sizes of cast blade alloys and cold formable or wrought alloys affects the performance of spring members manufactured from these materials when exposed to temperatures greater than about 1300° F. Cast blade alloys have a much larger grain size compared to cold formable alloys. The typical grain size of cold formable or wrought alloys is about 10 micrometers ($1 \times 10^{-6}$ m). The relatively finer grain size of the wrought alloys results from hot and cold forming a cast structure with intermediate annealing heat treatments. By contrast, certain cast blade alloys, such as cast blade alloys having a polycrystal structure (e.g., MARM 247 manufactured by Howmet Castings) include grains generally larger than 100 micrometers ($1 \times 10^{5}$ m) for equiaxed polycrystalline microstructure. For directionally solidified cast blade alloys, the grains are elongated along the length of the blade and the length of the grains could be several cm greater than (e.g., 1000×) of the typical wrought alloy grain size. In another case, certain cast blade alloys, such as CMSX3 or CMSX4 manufactured by Howmet Castings include a single crystal structure (i.e., the entire blade is made of a single grain).

The grain size of the cast bade alloys and the cold formable or wrought alloys affects the stress relaxation and creep of spring members 14 manufactured from these materials when exposed to temperatures greater than about 1300° F. Stress relaxation relates to the deformation of a material, in order to relieve strain, when exposed to a constant stress. Long term deformation of the material is caused by the deformation mechanism of creep. For both cast blade alloys and cold formable or wrought alloys, the primary mechanism of creep is grain boundary sliding. Materials having a relatively larger grain size, such as cast blade alloys, have a lower volume density of grain boundaries compared to materials, such as cold formable materials, which have a larger volume density of grain boundaries. A larger volume of grain boundaries increases a material's susceptibility to stress relaxation and creep. Accordingly, when exposed to temperatures greater than about 1300° F., because cast blade alloys have a relatively low volume density (or zero volume density) of grain boundaries, the cast blade alloys have a relatively better resistance to creep and stress relaxation compared to cold formable materials such as when exposed to temperatures greater than about 1300° F.

Figure 7:
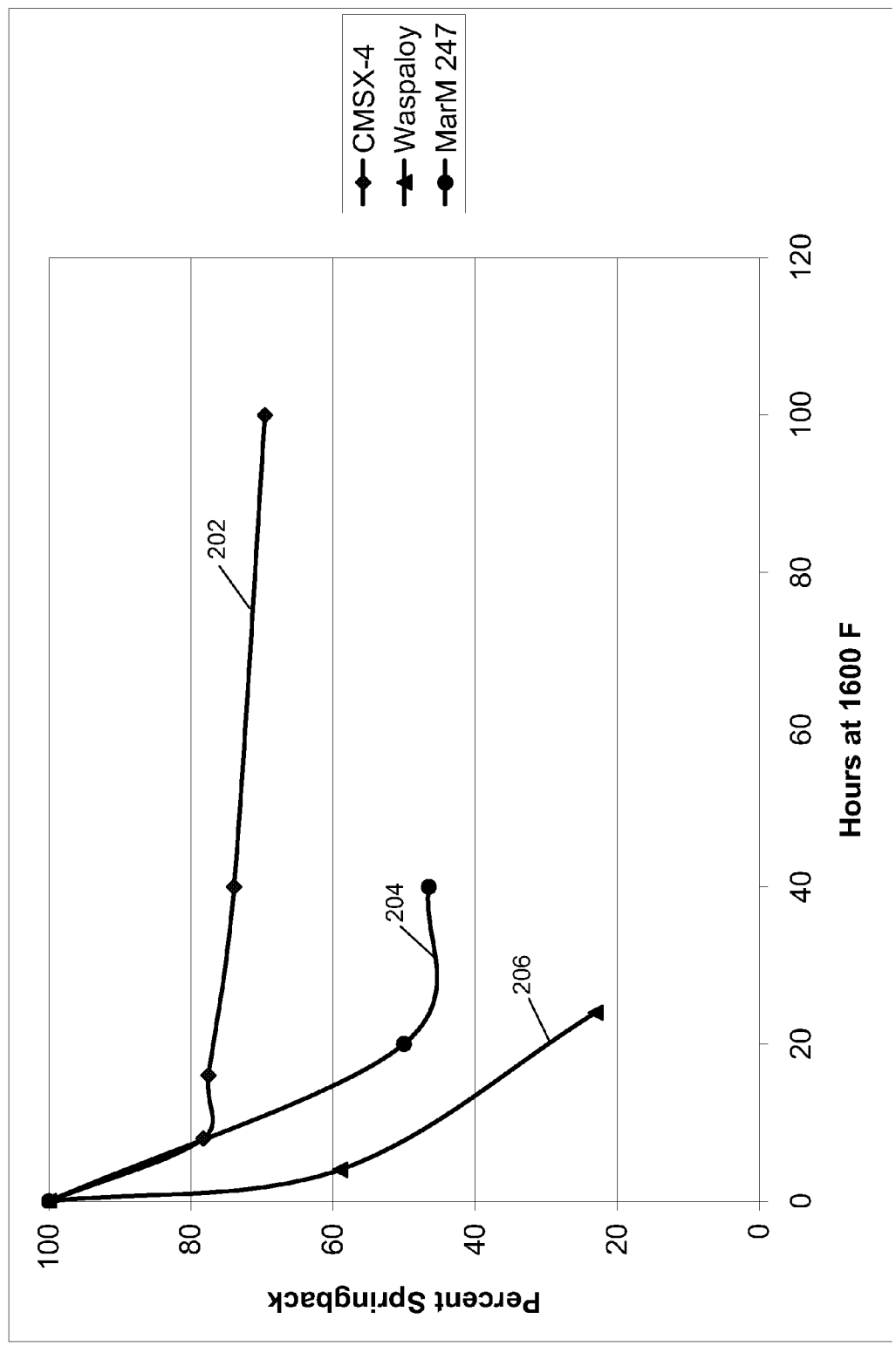
FIG. 7 is a graph showing example stress relaxation curves for a spring member manufactured from a single crystal cast blade alloy, a spring member manufactured from a polycrystal structure cast blade alloy, and a spring member manufactured from a cold formable material.

FIG. 7 is a graph 200 showing a set of example stress relaxation curves for different materials. The graph 200 includes an example stress relaxation curve 202 for a spring member manufactured from the single crystal cast blade alloy CMSX-4, an example stress relaxation curve 204 for a spring member manufactured from the polycrystal structure cast blade alloy MARM 247, and an example stress relaxation curve 206 for a spring member manufactured from the cold formable or wrought material Waspaloy. The graph 200 summarizes percent spring back of a seal height for each of the spring members as a function of exposure time at 1600° F.

With respect to the stress relaxation of the spring members, if there were no stress relaxation of the spring members, the percentage spring back value would remain unchanged at the initial value of 100% as the compression is completely elastic. Accordingly, as the flanges opposing a spring seal retract to their original position, the height of the seal 10 returns to its free height thereby maintaining the sealing contact. If, however, the spring member is completely relaxed in the compressed condition, as resulting from creep deformation, the remnant percentage spring back of the spring member will be zero and the spring seal will not track the flanges when they recede to their original position, thereby opening a leak path.

According to the graph 200, after about 20 hours of exposure at 1600° F., the remnant spring back values for spring members manufactured from wrought Waspaloy (curve 206), cast blade alloy MARM247 (curve 206), and cast blade alloy CMSX4 (curve 202) are respectively about 21%, 50% and 77%. After about 40 hours of exposure at 1600° F., the projected value of remnant spring back for wrought Waspaloy (curve 206) is almost zero, (i.e., the seal compressed height will be completely relaxed and permanently deformed without any capability to track the flanges when they move apart). This creates a large leak path opening between the spring seal and at least one of the opposing flanges. By contrast, for the cast blade alloys (curves 202 and 204) the remnant percentage spring back values have reached plateaus, about 45% for MARM247 (curve 204) and 70% for CMSX4 (curve 202), thereby minimizing the opening of a leak path between the spring seal and at least one of the opposing flanges. Accordingly, as indicated in the graph 200, spring members manufactured from a cast blade alloy (e.g., CMSX4 or MARM247) better track the motion of opposing flanges in a high temperature environment (temperatures greater than about 1300° F.) than can spring members formed from cold formable or wrought alloys (e.g., Waspalloy) to minimize leakage.

In another example, the differences between the coarsening characteristics of the strengthening gamma prime precipitates of cast blade alloys and cold formable or wrought alloys affects the performance of spring members manufactured from these materials when exposed to temperatures greater than about 1300° F. The coarsening characteristics of the strengthening gamma prime precipitates provide high temperature strength, such as yield strength, ultimate strength, and creep strength for example. The finer the size of the gamma prime precipitates, the higher the strength characteristics for the material. As cold formable alloys are exposed to high temperature (e.g., greater than about 1300° F.), the finer precipitates become larger or coarsen resulting in a decrease in strength and increased propensity of creep deformation. Because of the compositional differences, the gamma prime strengthening precipitates of cold formable alloys (e.g., wrought Ni—Cr superalloys) have higher coarsening rates than the gamma prime strengthening precipitates in cast blade alloys. The enhanced resistance of cast blade alloys is derived from both larger grain sizes and more stable or less prone to coarsen gamma prime precipitates compared to wrought alloy materials. The strengthening gamma prime ($\gamma'$) phases in cast blade alloys are very stable up to about 1800° F.

Typical strength characteristics of cast blade alloys and cold formable superalloys are shown in Table 1. As illustrated in Table 1, the yield strength values of the cast blade alloys (MARM 247, CMSX3 and CMSX4) are much higher than those of cold formable superalloys such as Inco 718, Waspaloy and the like.

TABLE 1

| Alloy Type | Alloy | Temperature (° F.) | Yield Strength (ksi) | % Elongation |
|---|---|---|---|---|
| Cast Blade Alloy, Polycrystal, equalized (bar) | MARM 247 | 1200° F. | 114 | 11 |
| Cast Blade Alloy, Single crystal (bar) | CMSX3 | 1400° F. | 163 | 11 |
| Cast Blade Alloy, Single crystal (Bar) | CMSX4 | 1600° F. | 122 | 18 |
| Cold Formable Superalloy (sheet) | Alloy 718 | 1475° F. | 104 | 8 |
| Cold Formable Superalloy (sheet) | Waspaloy | 1600° F. | 75 | 35 |
| Cold Formable Superalloy (sheet) | Rene 41 | 1600° F. | 80 | 20 |

Figure 9:
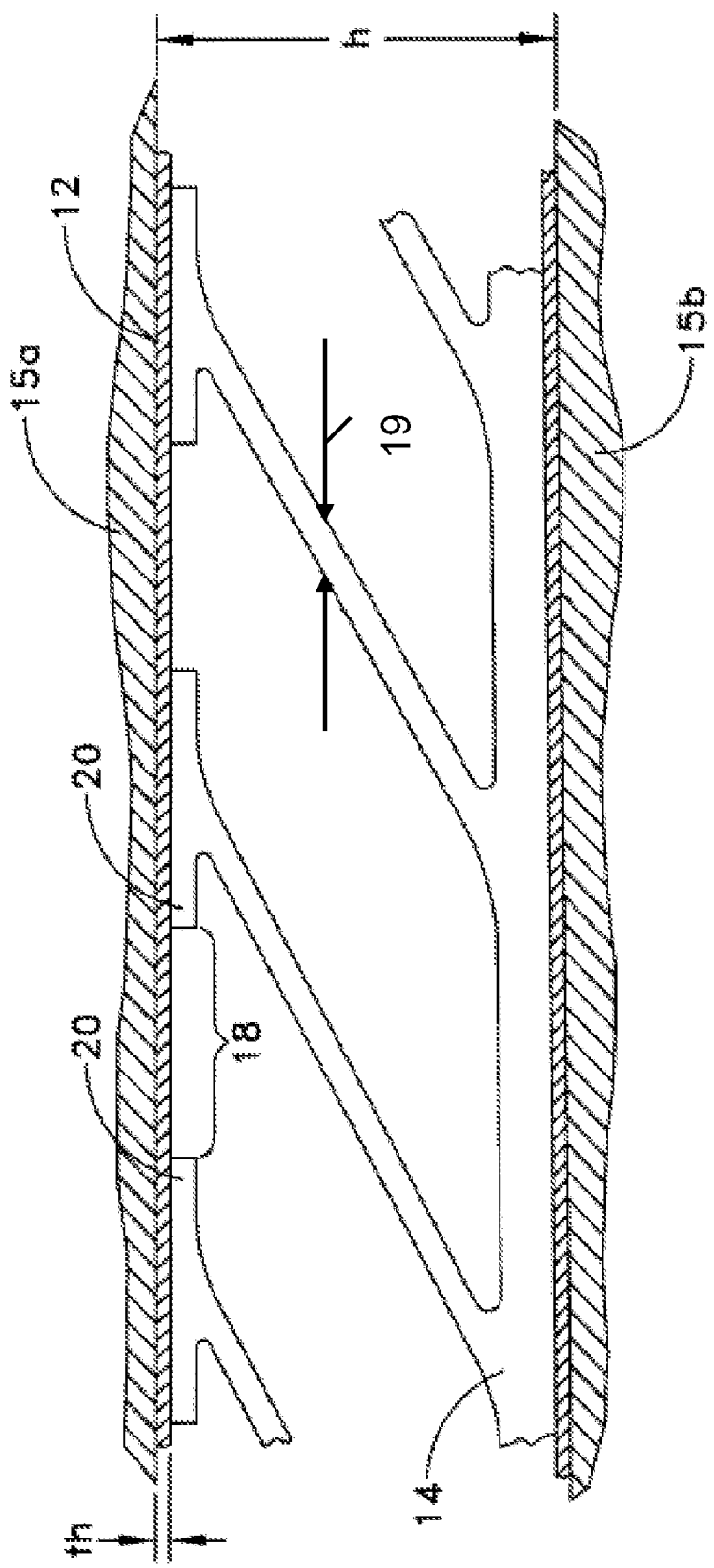
FIG. 9 is an enlarged view of the high temperature seal of FIG. 6.

As detailed above, and with reference to FIGS. 5, 6, and 9, the composite seal 10 includes a spring member 14 which controls the sealing load or the spring rate and a jacket 12 which provides a sealing surface. To achieve control of the sealing load, the spring member 14 must be able to provide a force sufficient to move the jacket 12 with the movement of flanges 15a, 15b. Thus, the spring rate of the jacket 12 is less than the spring rate of the spring member 14. In one arrangement, the spring rate of the jacket 12 is at least about 50% less than the spring rate of the spring member 14 to facilitate movement of the jacket 12 by the spring member 14. In the present embodiment, the spring rate is calculated as the force per unit circumferential length to compress the seal height, h (FIG. 9), or the distance between the sealing surfaces of the flanges 15a, 15b. For example, a spring rate of 15 lbs/inch per mil means a force of 15 lbs. per inch of seal circumference is necessary to compress the seal height h by 0.001".

In order to minimize the spring rate of the jacket 12, the thickness th of the jacket is very thin. For example, the thickness of the jacket 12 may be less than about 0.006" (i.e. 6 mils) in the present embodiment. At high temperatures, the composite structure of the spring member 14 is expected to maintain its elastic spring characteristics because of the superior high temperature strength characteristics of the blade alloy spring even when the weaker jacket 12 deforms plastically (i.e. permanently). So, even if the jacket 12 deforms plastically, the spring member 14 will be able to maintain the jacket 12 in sealing engagement with the flanges 15a, 15b as they move.

The spring member 14 can be configured in a variety of shapes. In one arrangement, as shown in FIGS. 8A-11, the spring member 14 is configured as one or more flexible members, for example flexible finger elements or finger springs 16, which are inclined with respect to a longitudinal axis 21 of the outer jacket 12. By controlling the number of fingers 16 per unit length, the width, the angle and the thickness (or depth) of the fingers 16, the overall spring rate of the spring seal 10 can be selectively adjusted. The design can also be optimized to minimize stress and the plastic zone in the fingers 16 at operating temperatures so that the majority of the spring deflection is in the elastic range and the spring seal 10 maintains its spring back characteristics, as described in greater detail below.

As shown in FIG. 9, gaps 18 are present between the substantially flat, planar top sections 20 of adjacent, inclined finger elements 16. The gaps 18 between adjacent top sections are provided to lower the spring rate and stresses in the finger elements 16 as they are compressed between flanges 15a, 15b during use. However, this discontinuity between individual fingers elements 16 can lead to non-uniform sealing loads along the seal circumference. As a result, higher sealing loads can be expected at the top sections 20 of the finger elements 16 pushing the jacket 12 against the flange 15a and somewhat lower sealing loads at the gaps 18 between the finger elements 16. This can potentially lead to leaks through the gaps 18.

Figure 10:
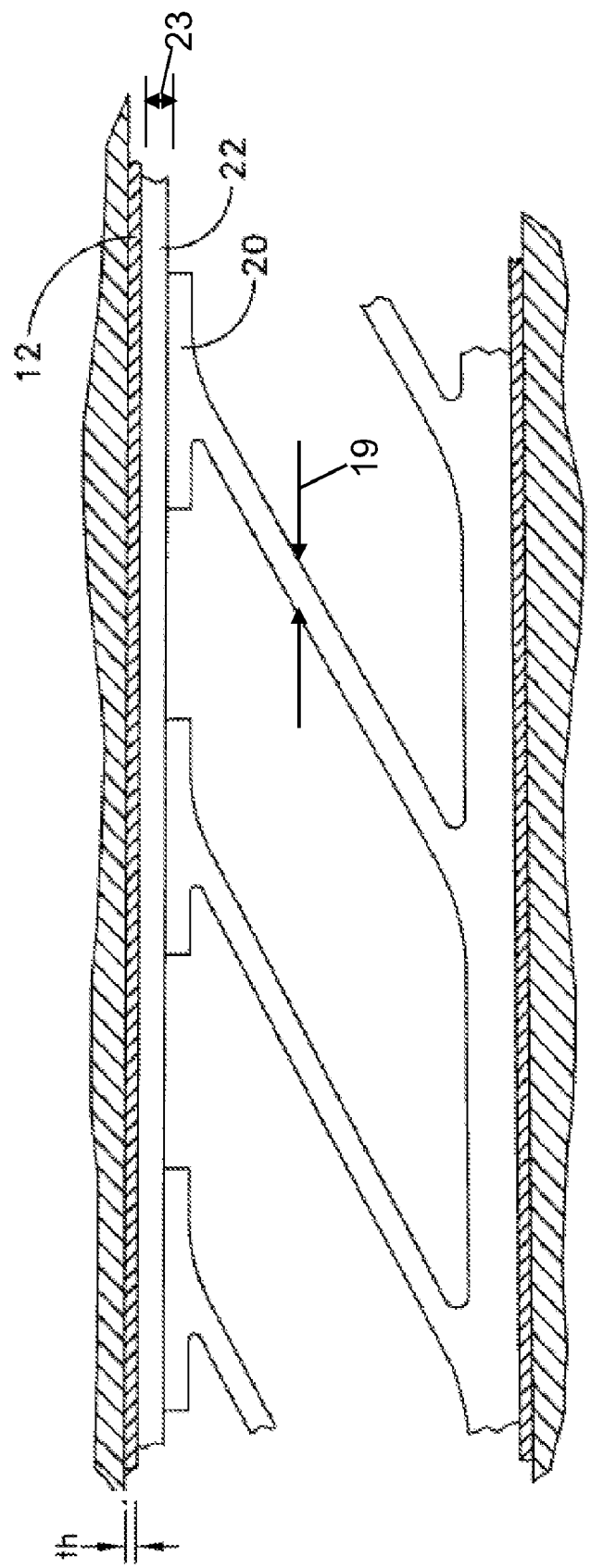
FIG. 10 is an enlarged, side view in partial cross-section of the spring member of FIG. 6 including a transition ring.

In order to curtail non-uniform sealing loads, in one arrangement, a somewhat rigid transition ring 22 is disposed between the jacket 12 and the discontinuous top sections 20, as shown in FIG. 10. The transition ring 22 can have a thickness 23 which is at least five times thicker than the thickness th of the jacket 12 (if made of the same or similar material) in order to impart sufficient rigidity to the transition ring 22. By incorporating a separate transition ring 22, the sealing load acting on the relatively thin sealing jacket 12 is made uniform around the seal circumference, while maintaining the low load or spring rate characteristics of individual finger springs 16.

As indicated above, the spring members 14 are manufactured from a cast blade alloy. However, cast blade alloys are hard and relatively brittle. Accordingly, cast blade alloys cannot be hot or cold rolled to a sheet stock to manufacture relatively thin structures. In one arrangement, the spring members 14 are fabricated from cast blade alloys by casting and machining shapes as shown in FIG. 7 and FIG. 8, including the plurality of inclined finger springs 16.

The spring member 14 as shown in FIGS. 6 and 8A-10 can be precision machined from a cast ring or precision cast using investment casting techniques. In addition, the resistance to stress relaxation caused by high temperature creep deformation can be enhanced by removing the grain boundaries or using a single crystal structure. One suitable technique for machining the springs is to use electro-discharge machining (EDM), as known to those of skill in the art. While the finger springs 16 can be precision machined or precision cast to a variety of thicknesses, in one arrangement, the finger springs 16 are precision machined or precision cast to a minimum thickness of about 0.02 inches. Such a thickness of the spring member 14 operated to maximize the spring back or elastic deflection of the spring member 14 after exposure to compressive loading at temperatures greater than about 1300° F.

Figure 11:
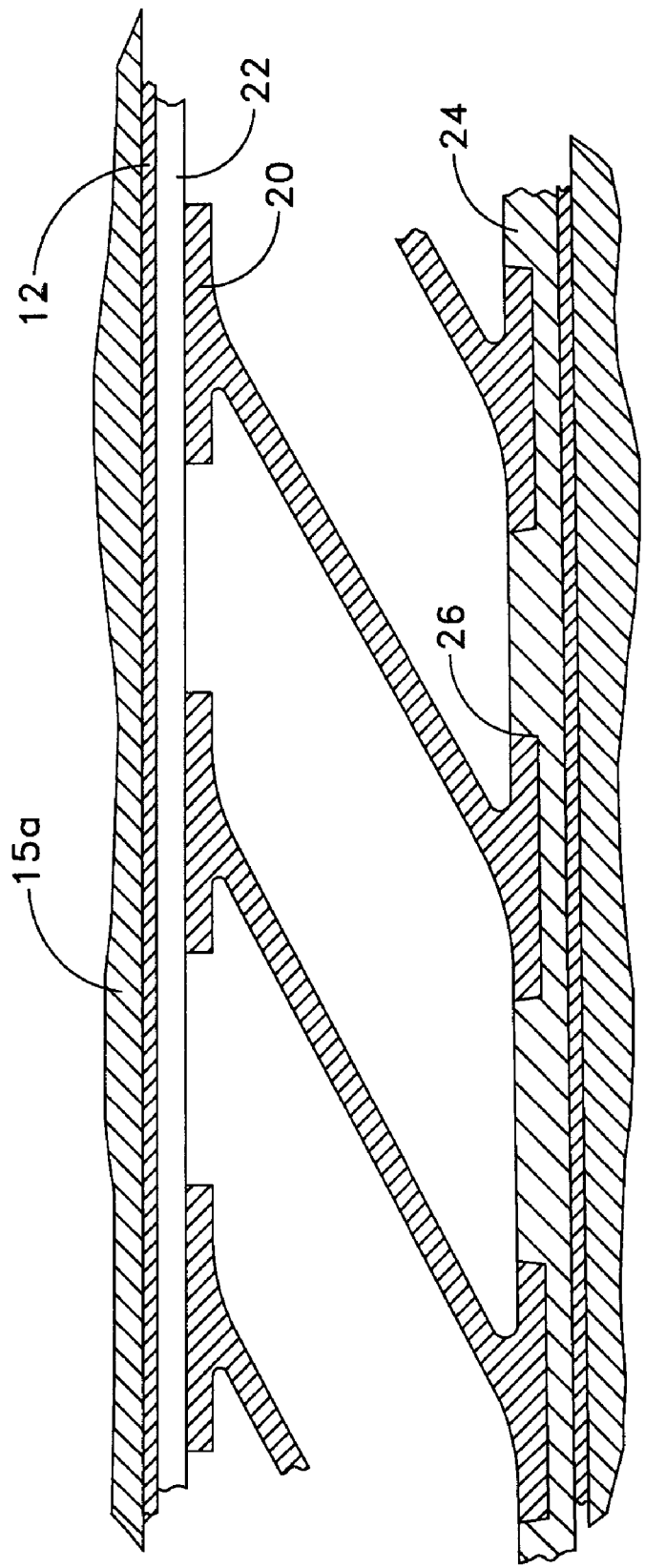
FIG. 11 is an enlarged, side view in partial cross-section of the spring member of FIG. 6 including a transition and holding ring.

If the entire structure is made from a cast single crystal ring and machined using EDM, it becomes very expensive to manufacture. In one arrangement, as illustrated in FIG. 11, in order manufacture the spring member 14 in a more affordable manner, the spring member 14 is fabricated from single crystal blade alloy finger springs 16 which are supported by a base such as a holding ring 24. While the base can be manufactured from a variety of materials, in one arrangement, the base made of commonly used wrought superalloys, for example Inco 718, Waspaloy, Rene 41 and the like. The highest creep strength single crystal structure is preferably used for the finger springs 16 which experience the highest stress during operation. The balance of the spring structure experiencing much lower stresses can be made from the less expensive, easily machinable superalloys. The single crystal finger springs 16 can be precision cast to the near-net shape and, with minor machining of the base, they can be secured to tight fitting grooves 26 machined on the superalloy holding ring 24. The single crystal finger springs 16 can be attached to the holding ring 24 by commonly used joining techniques such as brazing or welding techniques, as would be known to those of skill in the art. In this manner, large or small diameter seal rings 10 can be fabricated cost-effectively using cast, near-net shape single crystal blade alloy finger springs 16 attached to commonly used polycrystalline holding rings 24 machined from cast or forged blank rings.

As indicated above, the spring members 14 can be precision machined or precision cast to a minimum thickness of about 0.02 inches in order to maximize the spring back or elastic deflection of the spring member 14 after exposure to compressive loading at temperatures greater than about 1300° F. Additionally, in the case where the spring member 14 is fabricated from a single crystal cast blade alloys, by changing the crystallographic orientation of the single crystal cast blade alloy, the flexibility of the single crystal spring member 14 can, likewise, be changed.

Figure 12A:
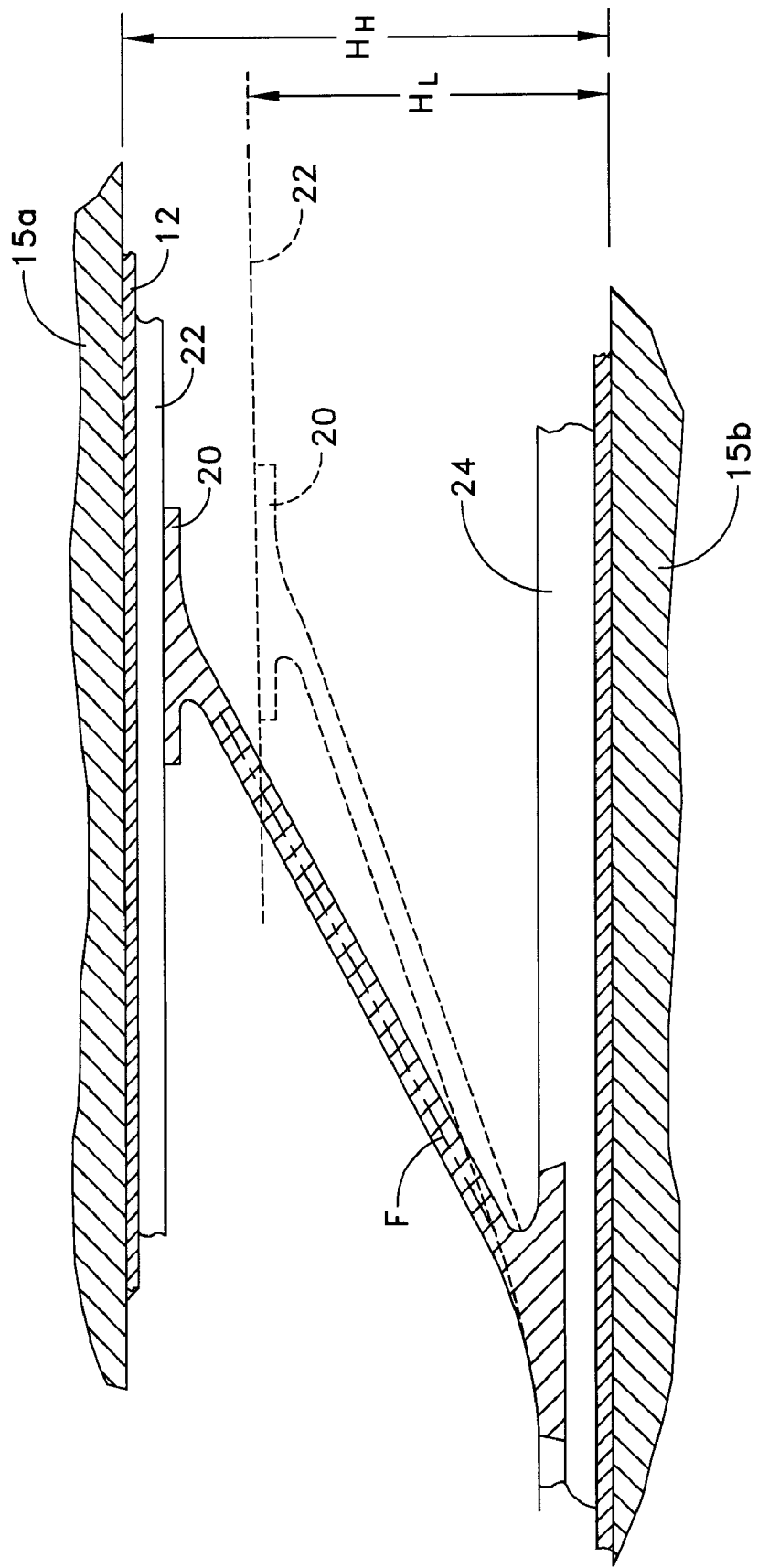
FIG. 12A is an enlarged cross-sectional side view of a single finger of the spring member of FIG. 6 illustrating deformation during flange movement.
Figure 12B:
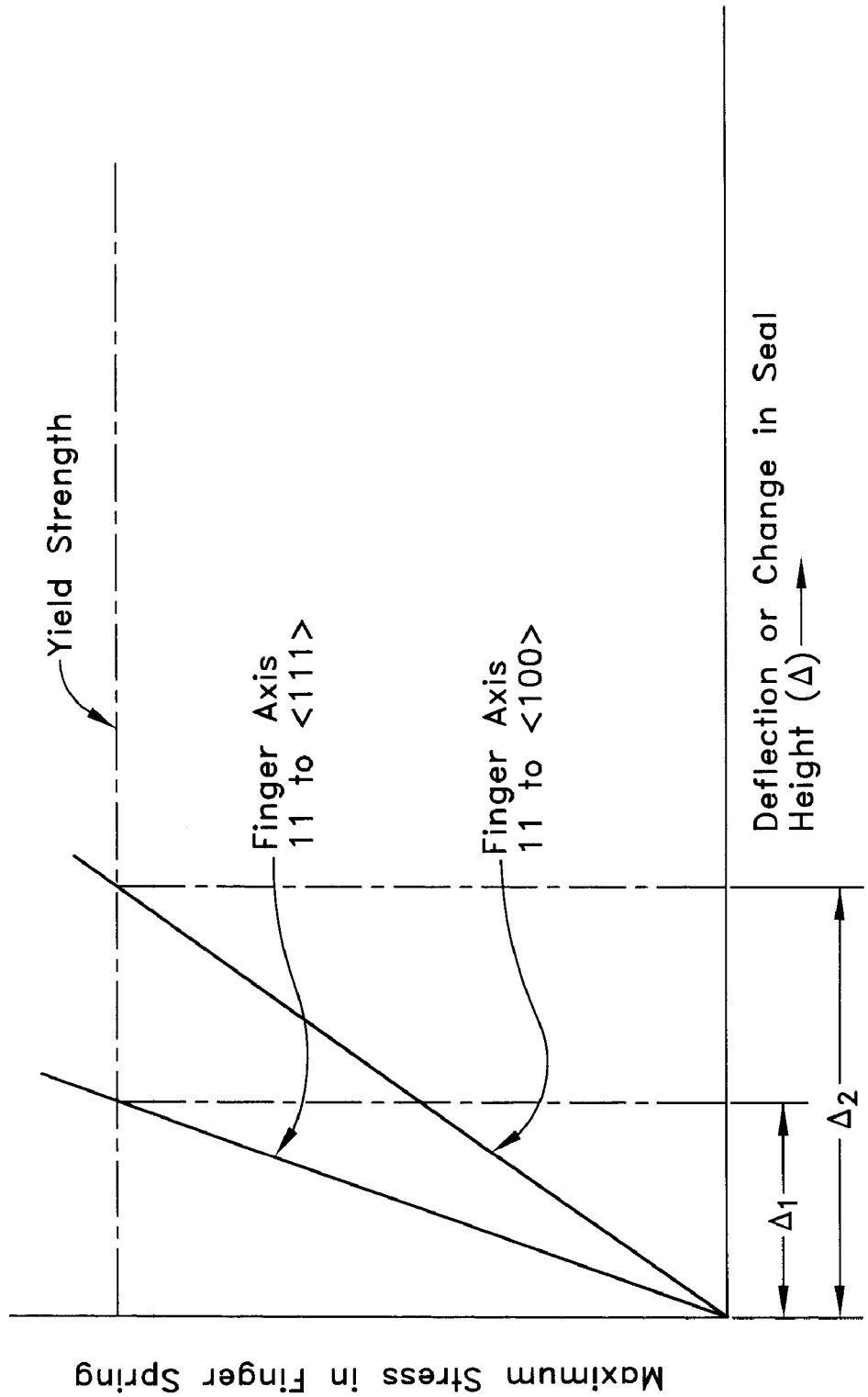
FIG. 12B is a chart showing change in seal height vs. maximum stress in the finger spring.

FIG. 12A is a cross-sectional side view of a single finger spring 16 of a spring member 14 illustrating deformation during flange movement. The graph of FIG. 12B illustrates two different seal height changes, $\Delta_1$ and $\Delta_2$, corresponding to cases where spring axis is parallel to <111> and <100> crystallographic directions of the cast blade alloy, in this example a nickel matrix. For nickel, the elastic modulus along <111> or E111 is about 2.2 times greater than the elastic modulus along <100> or E100. Thus, <100> is known as the "soft" crystallographic direction and <111> is known as the "hard" crystallographic direction. For example, if the axis of the finger, "F" is parallel to a softer crystallographic direction of the nickel matrix, as shown in FIGS. 12A-12B, the deflection of the seal height can remain elastic through a greater degree of flange movement than if the finger axis is parallel to the harder crystallographic direction. As the deflection remains elastic, the structural seal is able to follow the flanges 15a, 15b from the completely compressed condition (or lowest seal height, HL) to the fully retracted condition (or highest seal height, HH), thus maintaining sealing integrity and not allowing for a leak path for the pressurized fluid. Thus, the creation of a gap between the flanges 15a, 15b and the seal 10 is avoided even after the seal 10 is exposed to the high temperatures of greater than about 1300° F.

As will be appreciated, the maximum bending stress in the finger spring 16 is expected to increase with defection about 2.2 times faster when the finger axis is parallel to <111> compared to when it is parallel to <100>, as shown in FIG. 12B. If $\Delta_1$ is the maximum seal height deflection when maximum stress reaches yield strength for the <111> orientation of the finger axis and $\Delta_2$ is that for the <100> orientation, $\Delta_1$ and $\Delta_2$ represent maximum amounts of seal compression where compression is completely elastic and fully recoverable. It is desirable to keep the maximum stress less than the yield strength at the operating temperature so that the seal deflection remains in the elastic regime and the seal can track the flange movement and maintain sealing integrity. Thus, it is preferably to orient, i.e. align, the finger axis parallel to the "soft" direction so that the elastic range of the seal compression with the flange 15a, 15b movement can be more than doubled (about 2.2 times for Ni).

The present case illustrated only one illustrative embodiment of the inclined finger spring 16. However, other versions of inclined finger springs 16 can be designed based on the available geometric envelopes and application needs. Provided, however, that the highest strength single crystal structures utilized are for the finger springs 16 which experience the highest stresses. The remaining structures can be fabricated from easily machinable lower-cost superalloys. By using the single crystal structure only in the finger springs, they can be cost effectively investment cast to the near-net shape, thereby minimizing the fabrication cost. Also, the spring finger axis can be selected to maximize the elastic deflection range of the seal height.

Figure 13:
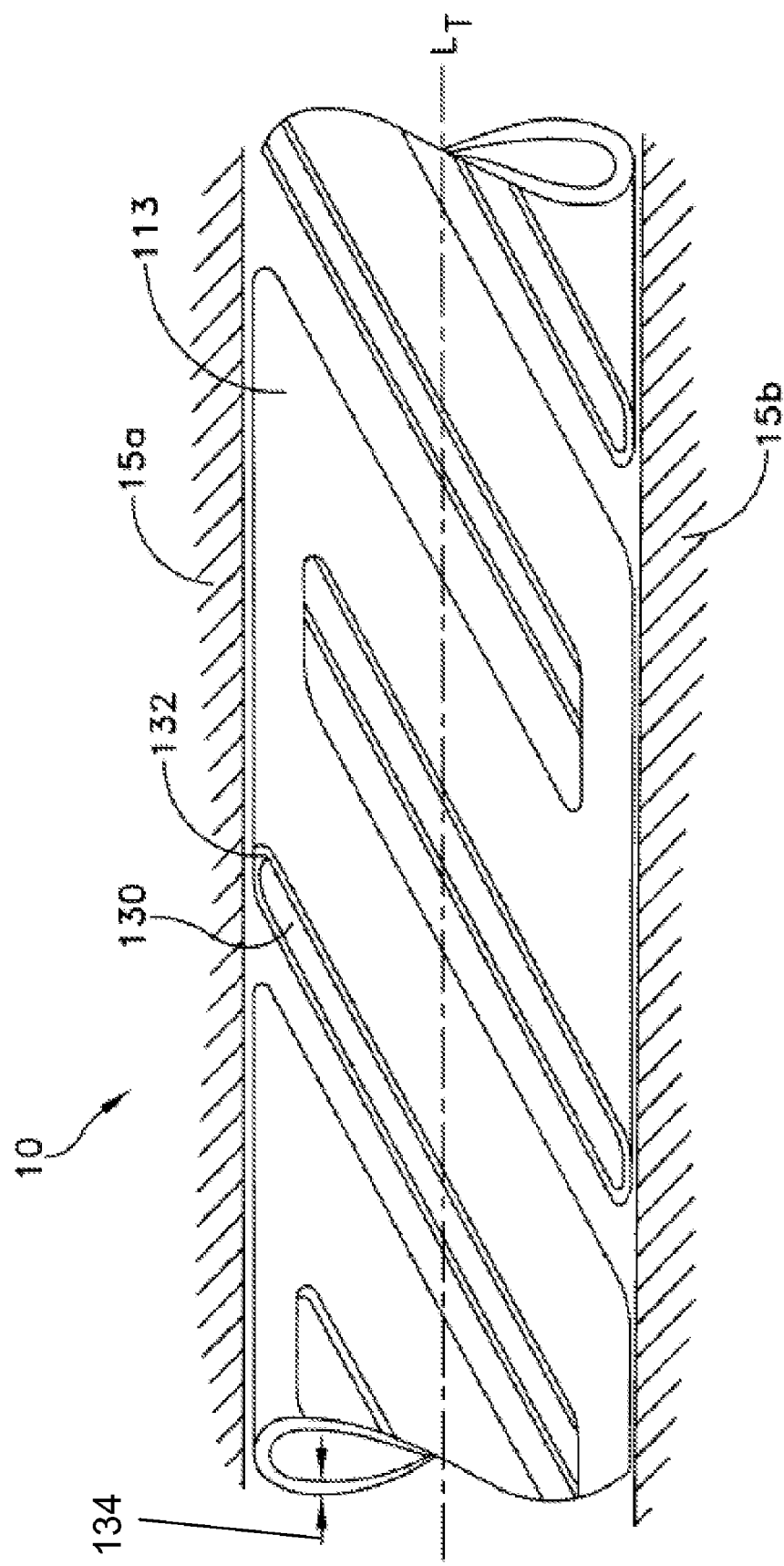
FIG. 13 is a side, partial cross-sectional view of an alternate embodiment of the spring member.

FIG. 13 illustrates an alternative embodiment in which an embodiment the spring seal 10 includes an outer sleeve or tube 113 made from a hollow tube of circular or elliptical cross-section with inclined slots 130, with the open ends 132 of the adjacent slots preferably disposed diametrically opposite to each other. The thickness of the tube, 134, number of slots per unit length, the width of the slots 130, and angle of the slots 130 with respect to the longitudinal axis, "LT" of the tube 113 can be optimized to minimize stress and plastic zone, and maximize elastic spring back, depending upon the particular application. In this manner, the majority of the deflection of the tube 113 is kept in the elastic regime and the spring maintains its spring back capability at higher temperatures.

Figure 4A:
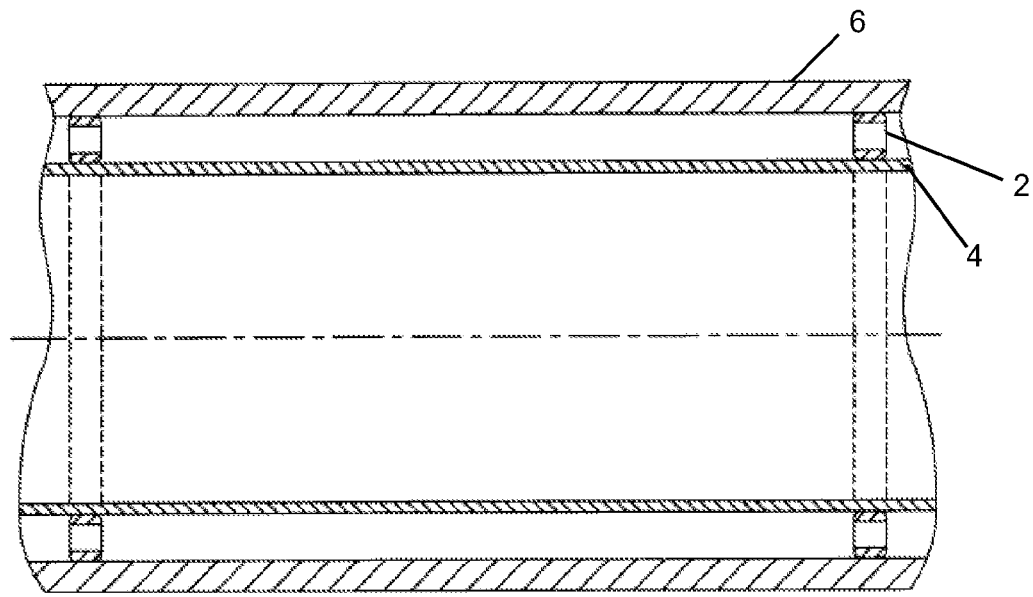
FIG. 4A is a schematic illustration of a prior art high temperature annular spring fastener.
Figure 4B:
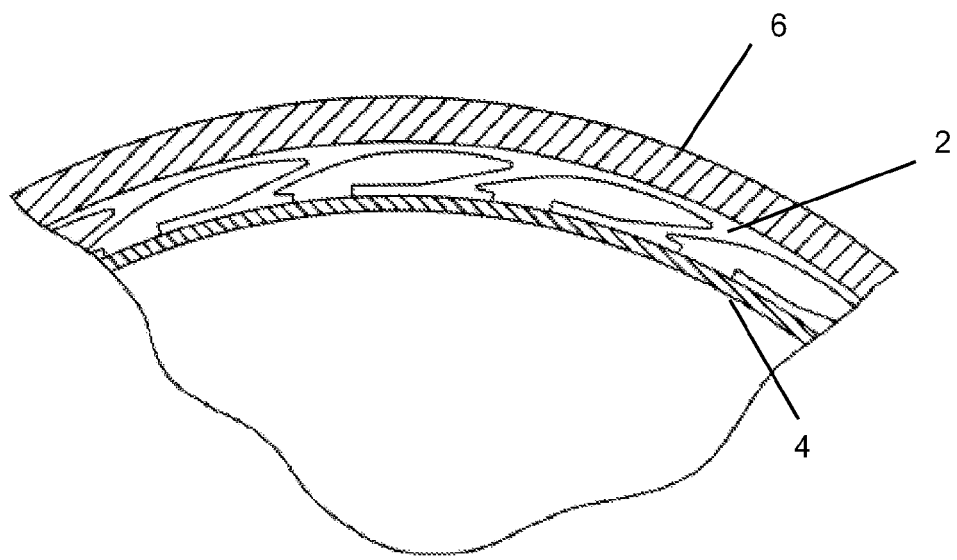
FIG. 4B is an enlarged, cross sectional view of the prior art annular spring fastener of FIG. 4A.
Figure 8A:
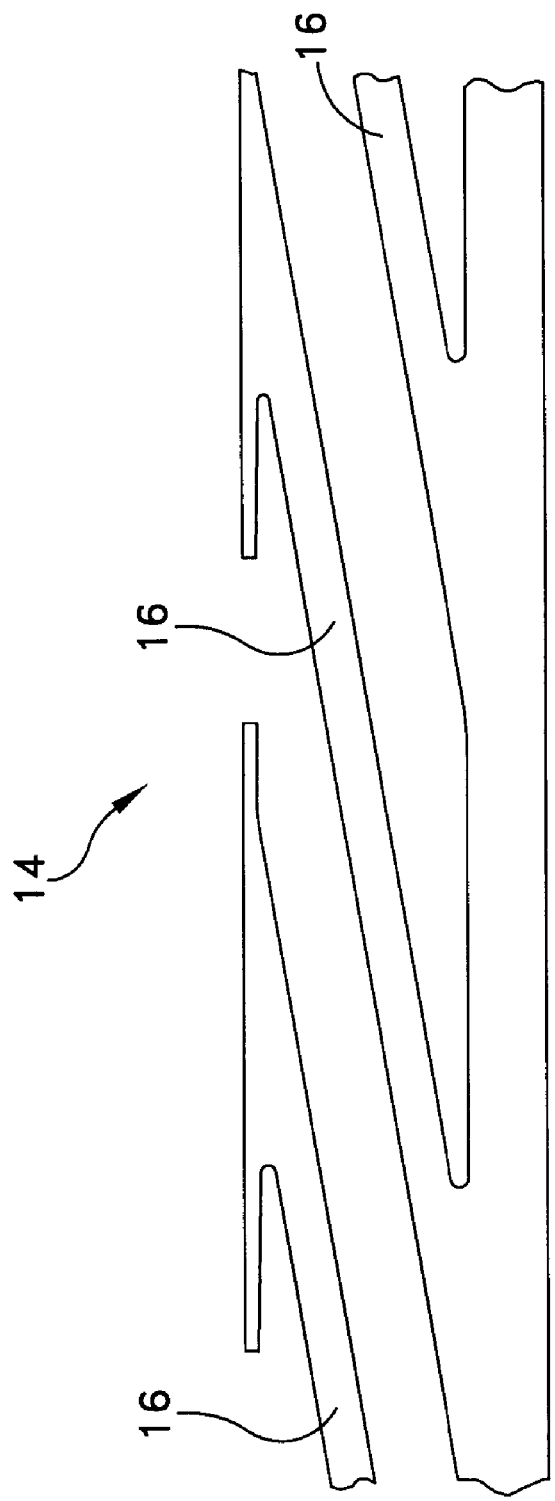
FIG. 8A is a side view of the spring member of FIG. 6.
Figures 8B, 8C:
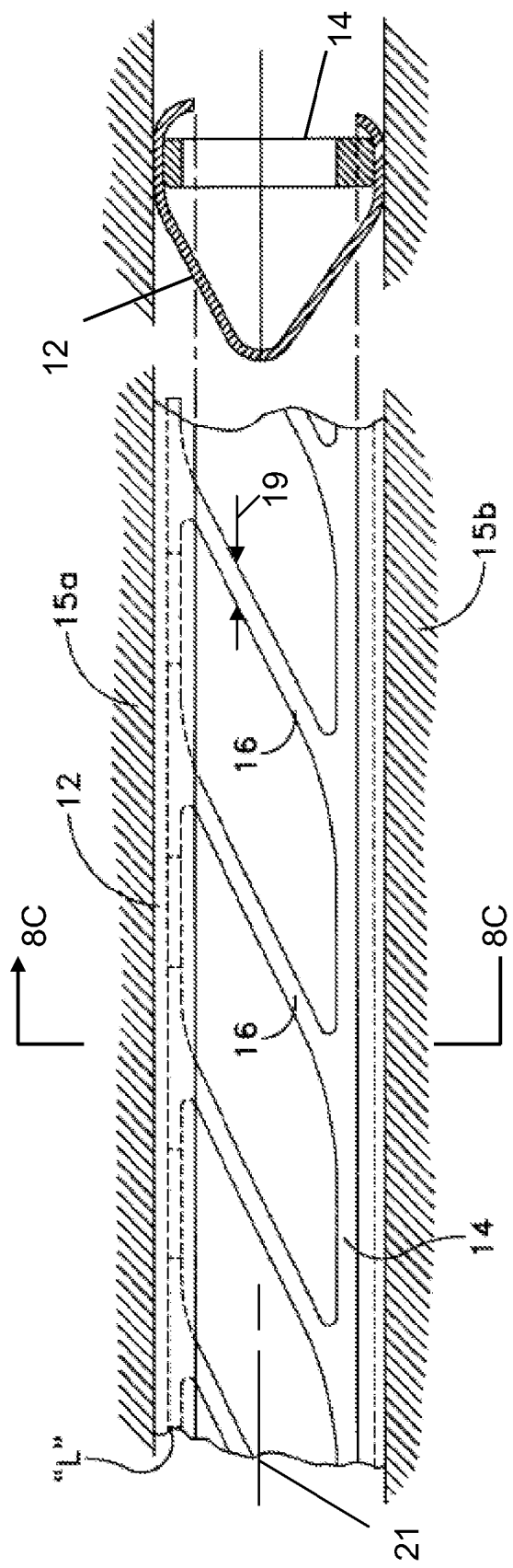
FIG. 8B is a side view of the high temperature seal of FIG. 6.
FIG. 8C is a cross-sectional of the high temperature seal of FIG. 6.

For the embodiment of either FIG. 8A or FIG. 13, the spring members 14 are preferably incorporated in a high temperature seal design where the spring members 14 are enclosed in an oxidation resistant cold formable sheet metal jacket 12 which provides a continuous sealing surface. The spring members 14 can also be used as high temperature fasteners to hold components with widely different thermal expansion coefficients such as metallic and ceramic components as shown in FIG. 4, illustrating a ceramic combustor liner held in a metal casing. It will also be appreciated that the spring members 14 as illustrated in this disclosure can be used for any spring application at temperatures greater than about 1300° F. If utilized as a fastener or for other applications, the outer sheet jacket 12 may, or may not be utilized, as desired.

It will be understood that various modifications may be made to the embodiments disclosed herein. For example, the geometric shape of the spring member 14 and jacket 12 can be modified, as can be the dimensions, as would be known to those of skill in the art. For example, as illustrated and describe above, the spring member 14 includes inclined finger springs 16. This illustration and description is by way of example only.

Figure 14:
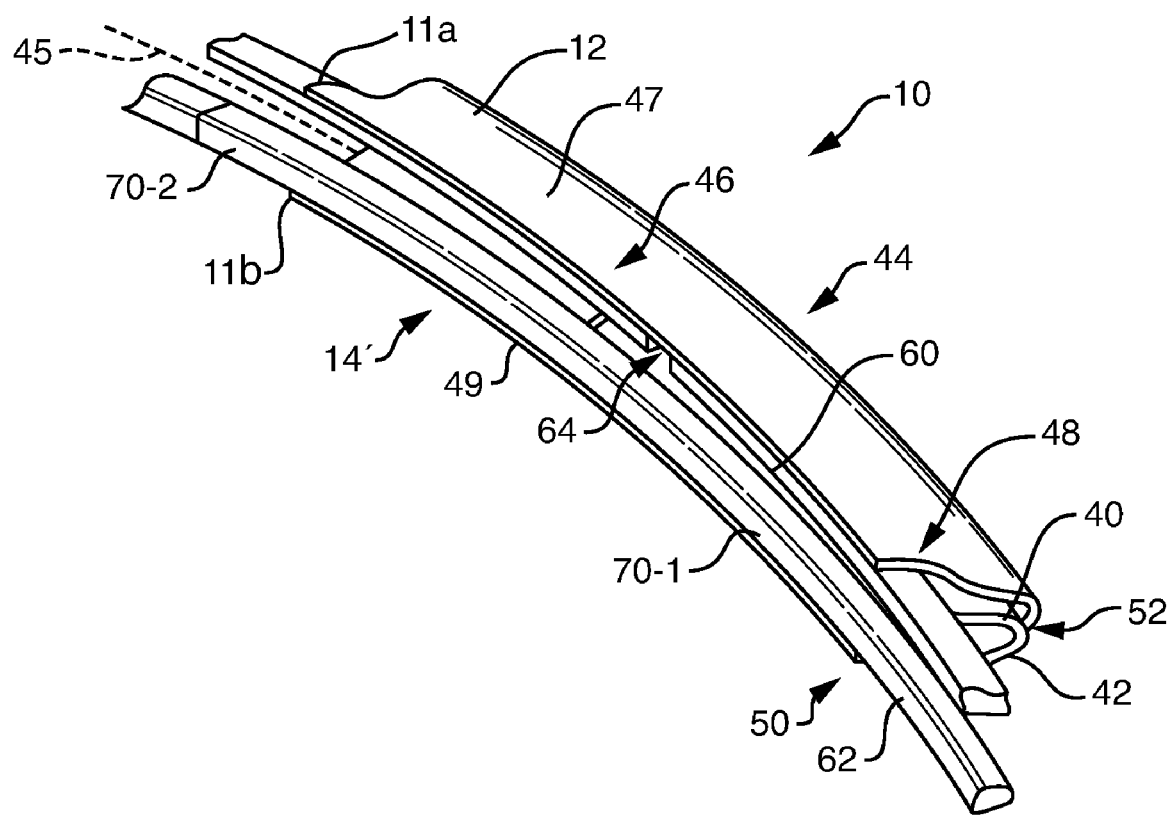
FIG. 14 is an enlarged view of an embodiment of a high temperature seal including an outer jacket and a spring member having inclined support elements.

In one embodiment of the spring seal 10, as illustrated in FIGS. 14-18, a spring member 14', manufactured from a cast blade alloy, is configured as having inclined, opposing support elements 40, 42 that extend from an outer periphery 44 of the jacket 12 toward an inner periphery 46 of the jacket 12. For example, a first support element 40 of the spring member is inclined relative to a longitudinal axis 45 of the spring member 14' and relative to the flange surface "S." The first support element 40 extends from the outer periphery 40 of the jacket 12 toward a first or upper sealing dam 47 positioned at the inner periphery 46 of the jacket 12. A second support element 42 of the spring member 14' is also inclined relative to a longitudinal axis 45 of the spring member 14' and relative to the flange surface "S." The second support element 42, extends from the outer periphery 40 of the jacket 12 toward a second or lower sealing dam 49, also positioned at the inner periphery 46 of the jacket 12. In such a configuration, the spring member 14' can have a substantially U-shaped or C-shaped cross-sectional profile. The spring member 14' includes a first sealing portion 60 extending from the first support element 40 and a second sealing portion 62 extending from the second support element 42. In one arrangement, the first and second sealing portions 60, 62 are configured as substantially flat or planar elements that are elongated along the longitudinal axis 45 of the spring member 14'. As illustrated in FIG. 14, the first and second sealing portions 60, 62 are disposed within corresponding upper and lower sealing dams 47, 49 of the jacket 12.

During operation, the first and second support elements 40, 42 move relative to the longitudinal axis 45 to position the upper and lower dams 47, 49 on the jacket 12, thereby causing the upper and lower dams 47, 49 to form a seal with opposing flanges 15a, 15b. Accordingly, the first and second support elements 40, 42 cause the first and second sealing portions 60, 62 to generate a load along the inner circumference of the jacket 12 (i.e., within the upper and lower sealing dams 47, 49). Such a configuration of the spring member 14' provides substantially balanced or equivalent forces to the upper sealing dam 47 and the lower sealing dam 49 of the jacket 12. Accordingly, the spring member 14' causes the jacket 12 (i.e., the upper and lower sealing dams 47, 49 of the jacket 12) to form a seal with opposing flanges 15a, 15b and minimize the formation of gaps between the spring seal 10 and the flanges 15a, 15b during operation.

In one arrangement, by controlling the number of inclined support elements 40, 42 per unit length, the width of the support elements 40, 42, the angle of inclination of the support elements 40, 42 (i.e. relative to the longitudinal axis 45), and the thickness of the support elements 40, 42, the overall spring rate of the spring member 14' and spring seal 10 can be selectively adjusted. The spring rate of seal 10, as used herein, is defined as the force per unit circumferential length of the seal to compress the seal height or the distance between the sealing surfaces of the flanges 15a, 15b. For example, a spring rate of 15 lbs/inch per mil means a force of 15 lbs. per inch of seal circumference is necessary to compress the seal height by 0.001".

For example, in the embodiment illustrated in FIGS. 14-19, the spring member 14' can be defined as a planar spring, as it includes two planar segments, first and second support elements 40, 42 having free ends 48, 50 and a common fixed end 52. Elastic deflection or spring back of the spring member 14' is mathematically defined as:

$$(6Pl^3)/Ebt^3$$

where:
P=sealing force
l=planar spring length (shown in FIG. 18 as l)
b=planar spring width
t=planar spring thickness
E=elastic modulus of the spring material.

In order to maximize the elastic deflection of the spring member 14', to enhance the ability of the spring member 14' to track movement of the flanges 15a, 15b, the length l of the support elements 40, 42 can be increased, the width b of the support elements 40, 42 can be reduced, or the thickness t of the spring element 14' can be reduced. By adjusting these variables associated with the spring member 14', deflection of the spring member 14' remains in the elastic range during operation. Accordingly, the spring member 14' maintains its spring back characteristics during operation. Additionally, as indicated above, the spring member 14' is fabricated from a cast blade alloy. Use of such a material helps to maintain stresses, as generated during operation, substantially within an elastic range thereby allowing the spring member 14' to operate at temperatures of greater than about 1300° F. while maintaining its spring back characteristics.

In one arrangement, as shown in FIGS. 14-16B, gaps 64 are incorporated between adjacent first sealing portions 60 of the spring member 14' within the seal 10. The gaps 64 between adjacent first sealing portions 60 are provided to lower the spring rate and stresses in the first support elements 40 of the spring member 14' as they are compressed between the flanges 15a, 15b during use. However, this gap or discontinuity 64 between individual first sealing portions 60 can lead to non-uniform sealing loads along the inner periphery or circumference 46 of the seal 10. As a result, higher sealing loads can be expected at the first sealing portions 60 of the spring member 14' to load the upper dams 47 of the jacket 12 against the flange 15a and somewhat lower sealing loads can be expected at the gaps 64 located between adjacent first sealing portions 60 of the spring member 14'. This can potentially lead to higher leak rates through the gaps 64. In order to curtail non-uniform sealing loads, the length of the gaps 64 are minimized. For example, a gap length of between about 0.5 mm (0.020 inches) and 3.5 mm (0.138 inches) can be utilized to minimize fluid leakage past the seal 10.

.As indicated above, the spring members 14' are manufactured from a cast blade alloy. However, cast blade alloys are hard and relatively brittle. Accordingly, cast blade alloys cannot be hot or cold rolled to a sheet stock to manufacture relatively thin structures. In one arrangement, the spring members 14 are fabricated from cast blade alloys by casting or machining shapes as shown in FIG. 7 and FIG. 8

The spring members 14' as shown in FIGS. 14-17 can be precision machined from a cast ring or precision cast using an investment casting technique. The investment casting technique allows the spring member to be manufactured from the cast blade alloy with a relatively small thickness. For example, the spring member 14' can be manufactured with a thickness of at least about 0.02 inches. Such a thickness allows the deflection of the spring member 14' to remain in an elastic range during operation.

Figure 15:
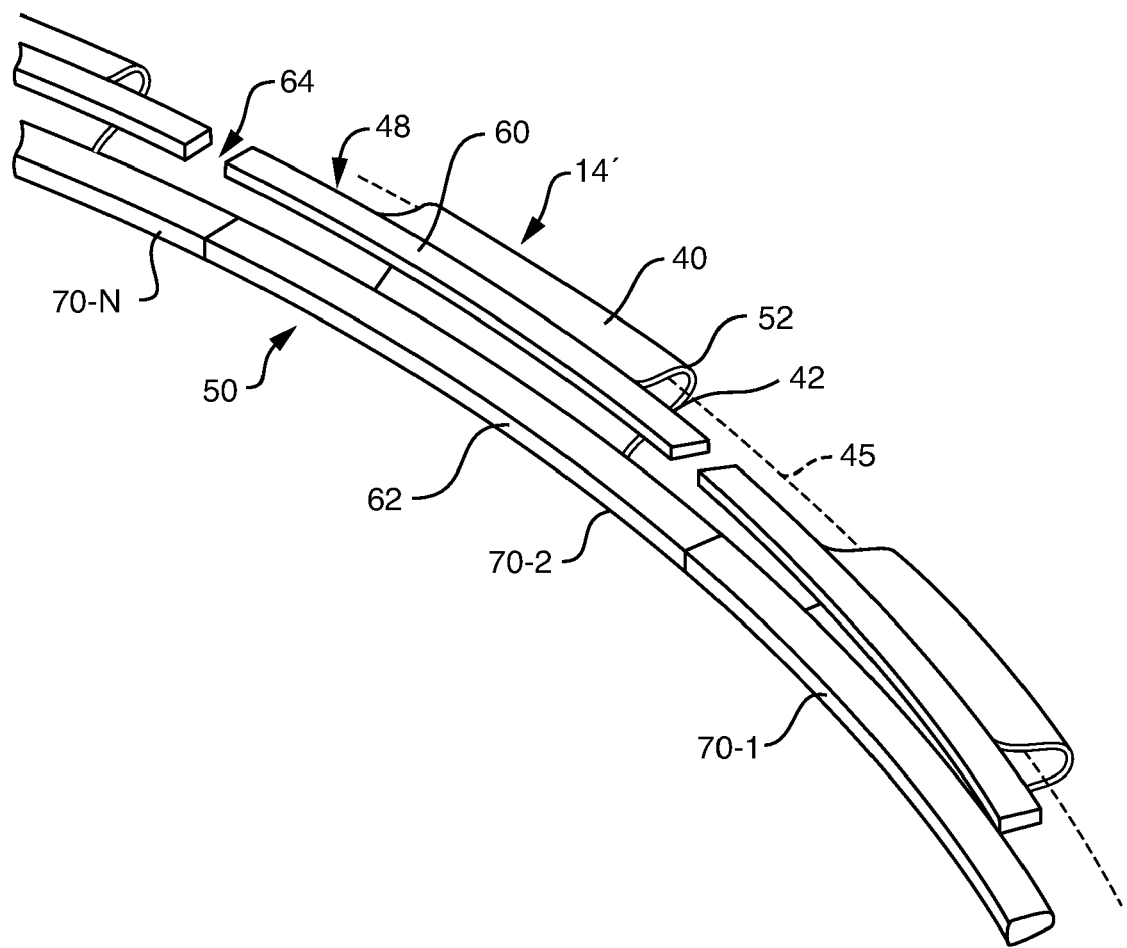
FIG. 15 is an enlarged view of the spring member of FIG. 14.
Figure 16B:
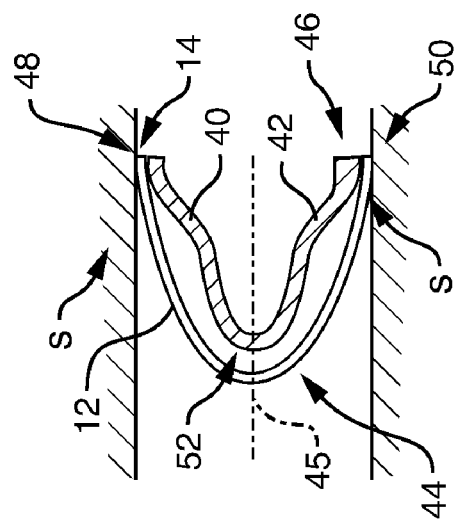
FIG. 16B is a cross-sectional of the high temperature seal of FIG. 14.
Figure 16A:
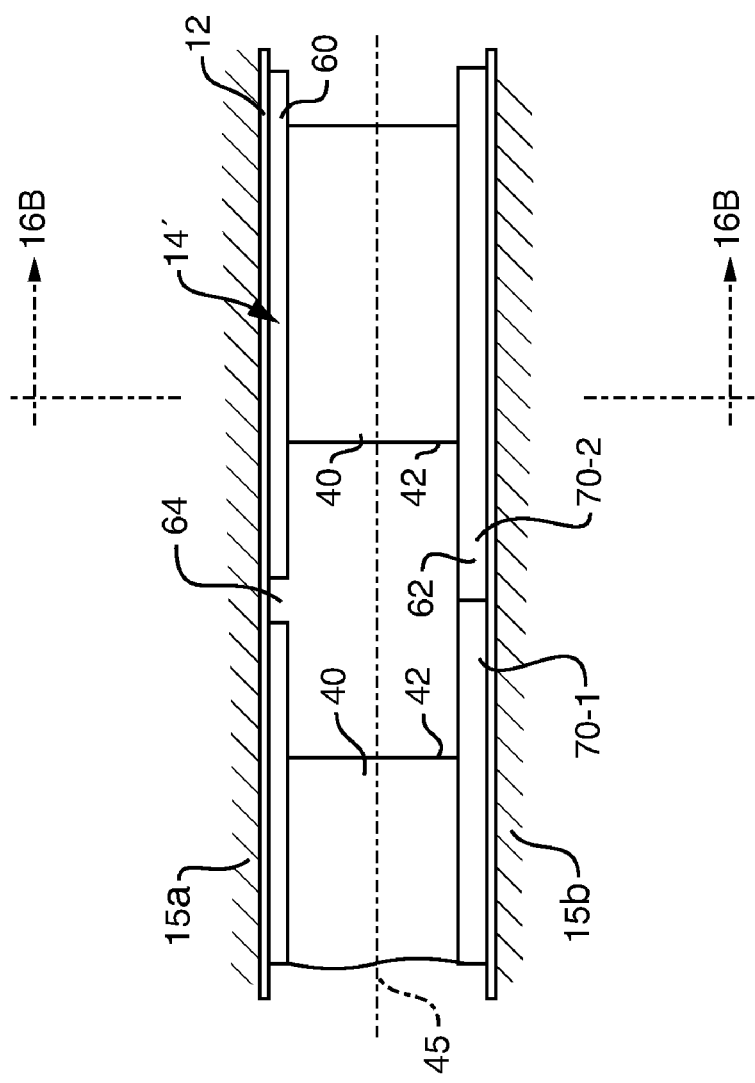
FIG. 16A is a side view and cross-section of the high temperature seal of FIG. 14.
Figure 17:
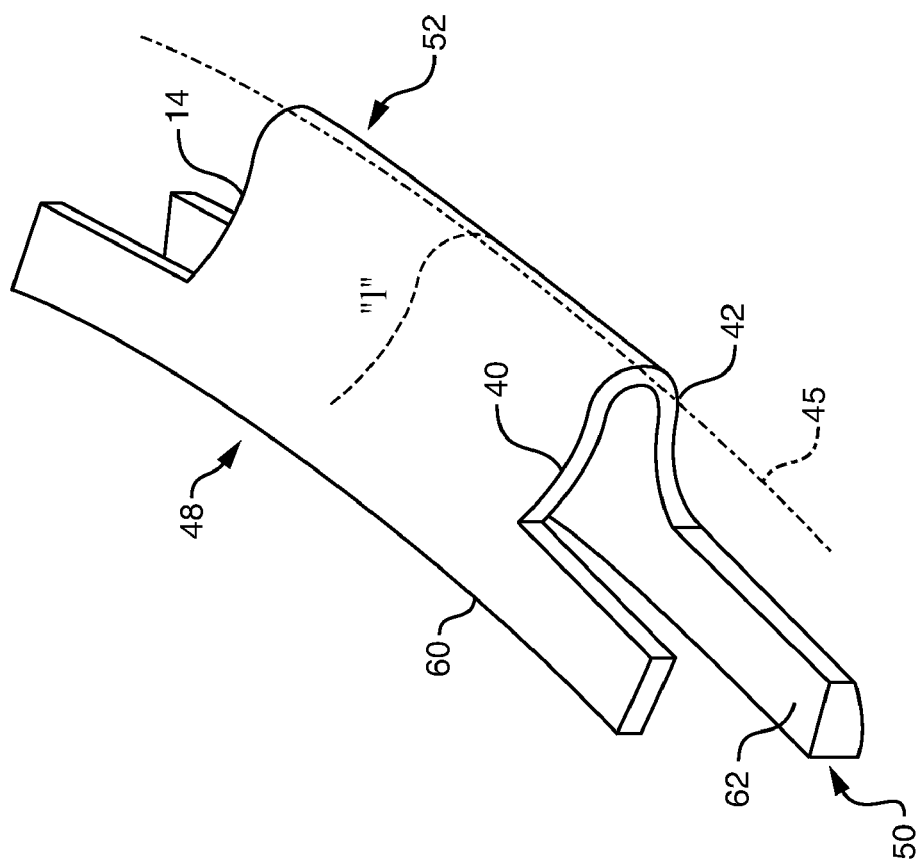
FIG. 17 is an enlarged rear isometric view of the spring member of FIG. 14.
Figure 18:
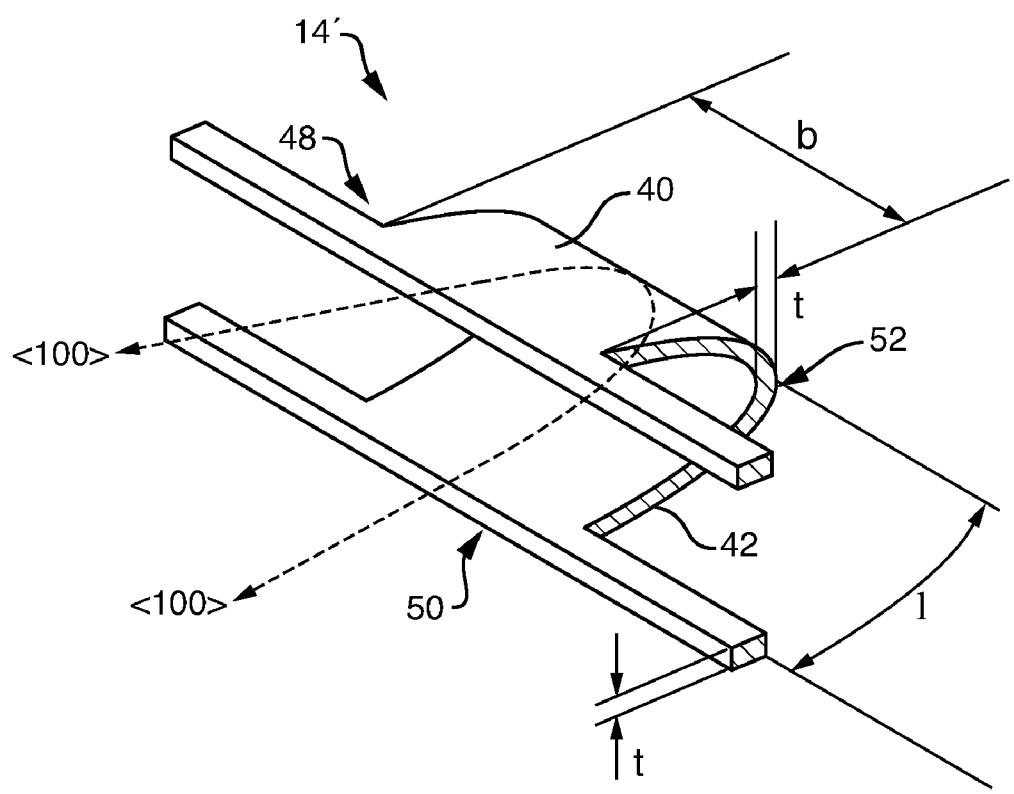
FIG. 18 is a schematic front isometric view of the spring member of FIG. 14.

In addition, the resistance to stress relaxation caused by high temperature creep deformation can be enhanced by removing the grain boundaries or using a single crystal structure. One suitable technique for machining the springs is to use electro-discharge machining (EDM), as known to those of skill in the art. However, if the entire inner spring structure is made from a cast single crystal ring and machined using EDM, it becomes very expensive to manufacture. In order to more cost effectively manufacture the spring member 14', as shown in FIGS. 14-16, spring member elements 70-1, 70-2, 70-N having the support elements 40, 42 are cast as separate segments. The individual spring segments 70 of the spring member 14' are configured as modular building blocks for a complete spring member 14'. In this embodiment, a variable number of the spring member elements 70 are arranged in a side-by-side manner to create spring members 14' having different circumferences, depending upon the diameter and circumference required for the spring seal 10.

In one arrangement, the spring segments 70 are joined together using suitable techniques such as welding or brazing. For example, the substantially flat planar second sealing portion 62 of adjacent spring member elements 70 are joined together to form the desired length of the spring member 14' of the seal 10. By joining the second sealing portion 62 of adjacent spring member elements 70, appropriate configurations such as spring element design, the number of support elements 40, 42 per spring member element 70, the diameter of the spring member 14', spring seals 10 of any size (i.e., diameter) can be fabricated cost effectively thereby avoiding the expense of casting large diameter seal springs as single components.

As indicated above, the spring member 14' can be precision machined or precision cast to a minimum thickness of about 0.02 inches in order to maximize the spring back or elastic deflection of the spring member 14' after exposure to compressive loading at temperatures greater than about 1300° F. Additionally, in the case where the spring member 14' is fabricated from a single crystal cast blade alloys, by changing the crystallographic orientation of the single crystal cast blade alloy, the flexibility of the single crystal spring member 14' can, likewise, be changed.

Figure 19:
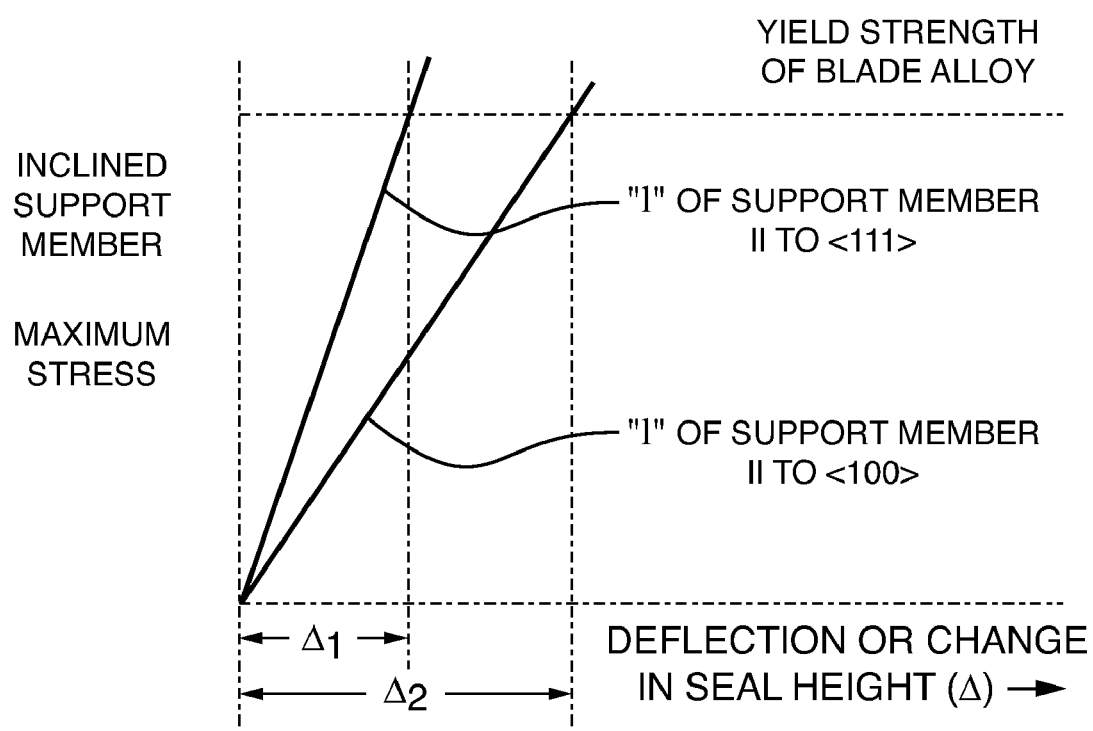
FIG. 19 is a chart showing change in seal height vs. maximum stress in the inclined support member of the spring segment of FIG. 14.

For example, the graph of FIG. 19 illustrates two different seal height changes, $\Delta_1$ and $\Delta_2$, corresponding to cases where the length "l" of the inclined support member is parallel to <111> and <100> crystallographic directions of the nickel matrix for the blade alloys. For nickel, the elastic modulus along <111> or $E_{111}$ is about 2.2 times of that along <100> or $E_{100}$. Thus, <100> is known as the "soft" crystallographic direction and <111> is known as the "hard" crystallographic direction. For example, if the length "l" of the inclined support member is parallel to a softer crystallographic direction <100> of the nickel matrix, as shown in FIG. 19, the deflection $\Delta_2$ of the seal height can remain elastic through a greater degree of flange movement than if the length is parallel to the harder <111> direction for which the maximum elastic deflection is $\Delta_1$.

As will be appreciated, the maximum bending stress in support member 40 or 42 of the spring member 14' is expected to increase with deflection about 2.2 times greater when the length "l" is parallel to <111> crystallographic direction compared to when it is parallel to <100>, as shown in FIG. 19. If $\Delta_1$ is the maximum seal height deflection when maximum stress reaches yield strength for the <111> orientation and $\Delta_2$ is that for the <100> orientation, $\Delta_1$ and $\Delta_2$ represent maximum amounts of seal compression where compression is completely elastic and fully recoverable. It is desirable to keep the maximum stress less than the yield strength at the operating temperature so that the seal member 14' deflection remains in the elastic regime and the seal can track the flange 15a, 15b movement and maintain sealing integrity. Thus, with reference to FIG. 18, it is preferable to orient the inclined support element 40, 42 length "l" parallel to the "soft" direction (i.e. <100> is parallel to "l" for both support elements 40, 42) so that the elastic range of the seal compression to track the flange 15a, 15b movement can be more than doubled (about 2.2 times for Ni).

As indicated above, in order to more cost effectively manufacture the spring member 14', spring member elements 70-1, 70-2, 70-N are cast as separate segments. A variable number of the spring member elements 70 can be arranged in a side-by-side manner and joined together, such as by a brazing process, to create a spring member 14'. In one arrangement, in order to allow the spring member elements 70 to be assembled into a spring member 14' in a substantially efficient manner, the spring member elements 70 are configured to at least partially interlace with each other when disposed in a side-by-side manner.

Figure 20:
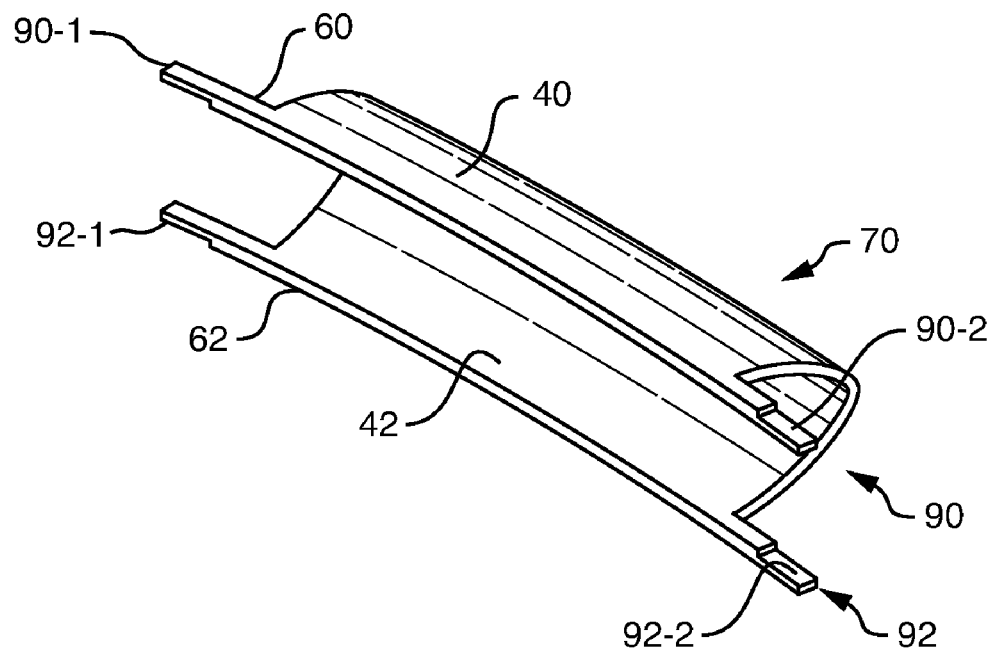
FIG. 20 illustrates a perspective view of a spring member element having lap portions disposed on either end of opposing first and second sealing portions.
Figure 21:
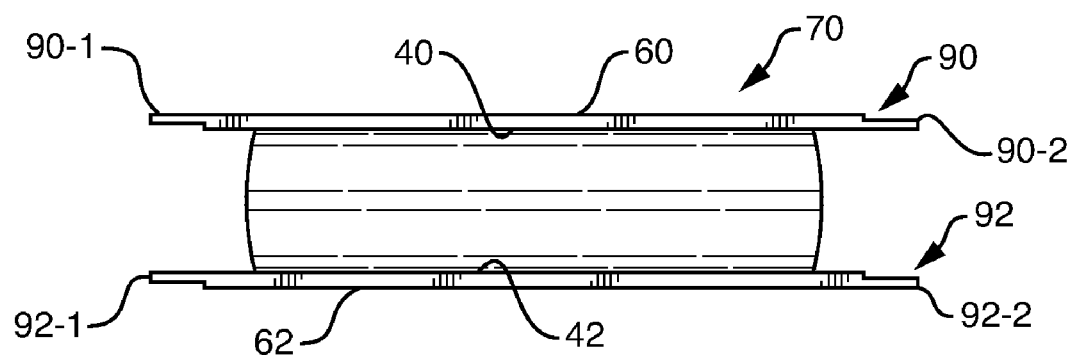
FIG. 21 illustrates a front view of the spring member element of FIG. 20.
Figure 22:
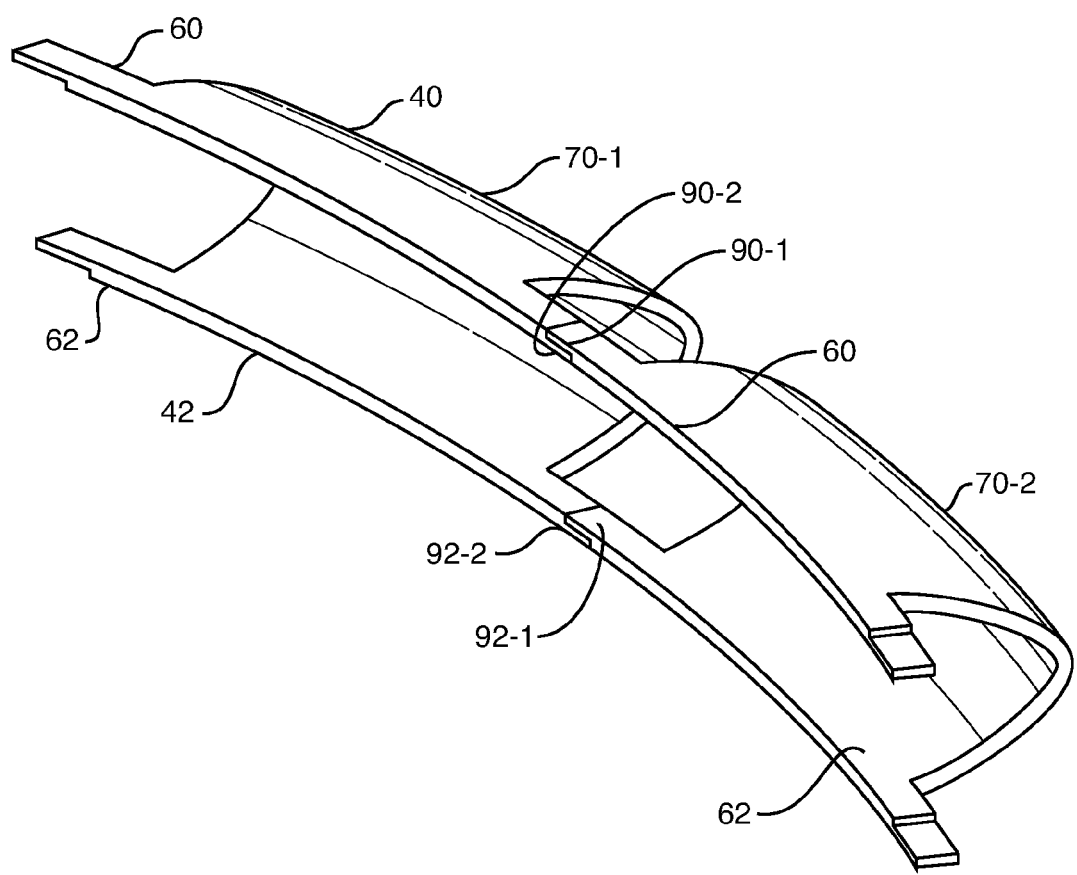
FIG. 22 illustrates two spring member elements disposed in a side-by-side arrangement.

As illustrated in FIGS. 20 and 21, the first and second sealing portions 60, 62 of the spring member 14' include lap portions 90, 92. For example, the first sealing portion 60 includes opposing tabs or lap portions 90-1 and 90-2 while the second sealing portion 62 includes opposing lap portions 92-1 and 92-2. The lap portions 90, 92 of the spring member element 70 are configured to form lap joints with lap portions of adjacently disposed spring member elements 70. For example, as indicated in FIG. 22, the lap portion 90-2 of the first spring member element 70-1 forms a lap joint with the lap portion 90-1 of the second spring member element 70-2 while the lap portion 92-2 of the first spring member element 70-1 forms a lap joint with the lap portion 92-1 of the second spring member element 70-2. Such a configuration allows a manufacturer to arrange adjacent spring member elements 70-1, 70-2 in a side-by-side arrangement while minimizing the presence of gaps between the first and second sealing portions 60, 62 adjacent elements 70-1, 70-2.

Once arranged in a side-by-side manner, the manufacturer joins the adjacent spring member elements 70-1, 70-2, such as by a brazing process, to create a spring member 14'. The manufacturer then sheathes the spring member 14' in a formed sheet metal jacket to produce the spring seal.

In one arrangement, the manufacturer brazes only the lap joints formed between lap portions 92 of abutting second sealing portions 62 of adjacent spring member elements 70-1, 70-1. Accordingly, the lap joints formed between the lap portions 90 of abutting first sealing portions 60 of adjacent spring member elements 70-1, 70-2 remain unattached. The unattached, abutting first sealing portions 60 help to lower the spring rate and stresses in the first and second support elements 40, 42 as they are compressed between flanges 15a, 15b during use. In another arrangement, the lap joints formed between the lap portions 90 of abutting first sealing portions 60 of adjacent spring member elements 70-1, 70-2 can be attached together by the manufacturer via the brazing process.

Figure 23:
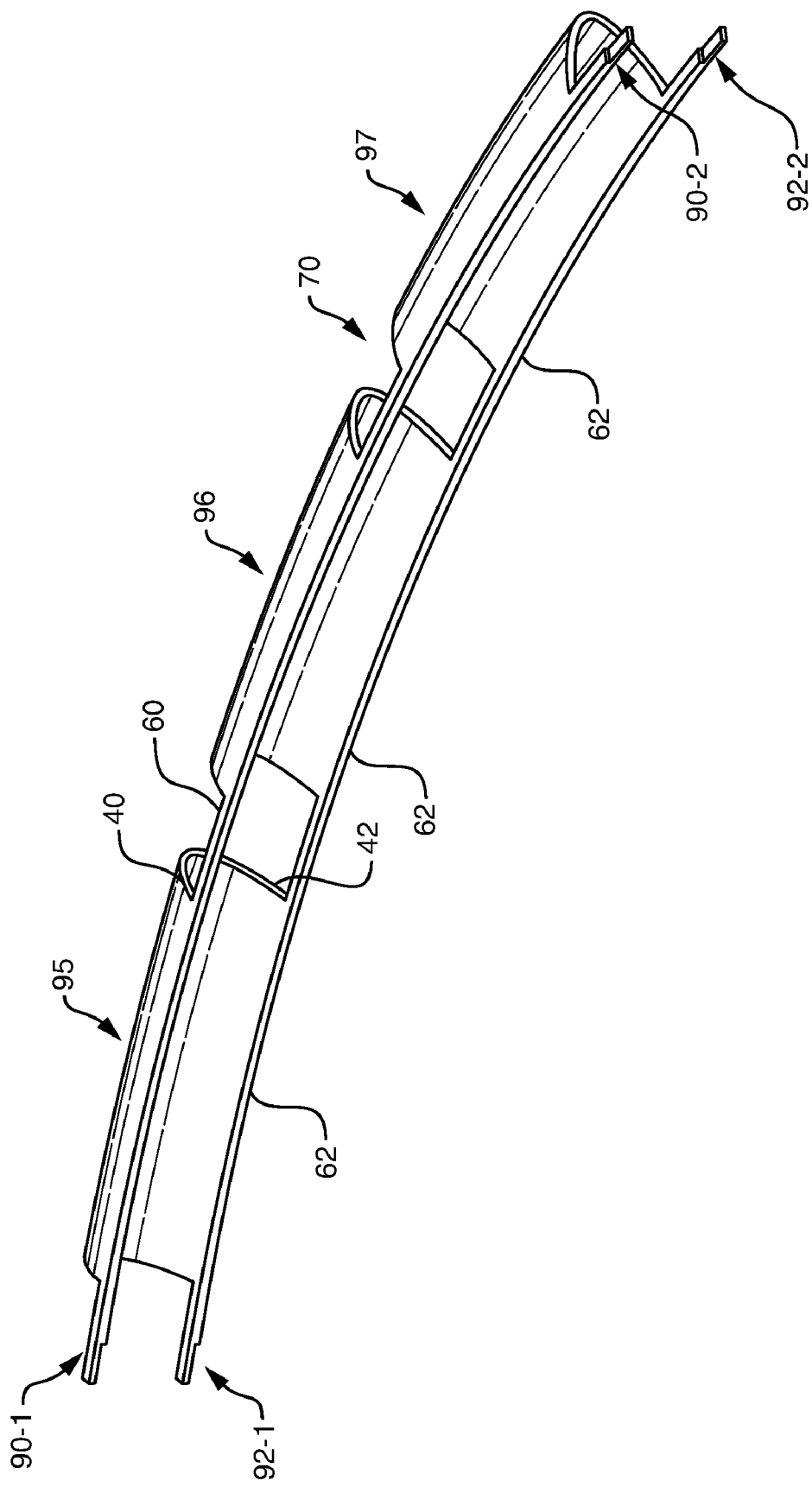
FIG. 23 illustrates an alternate arrangement of the spring member element of FIG. 20.
Figure 24:
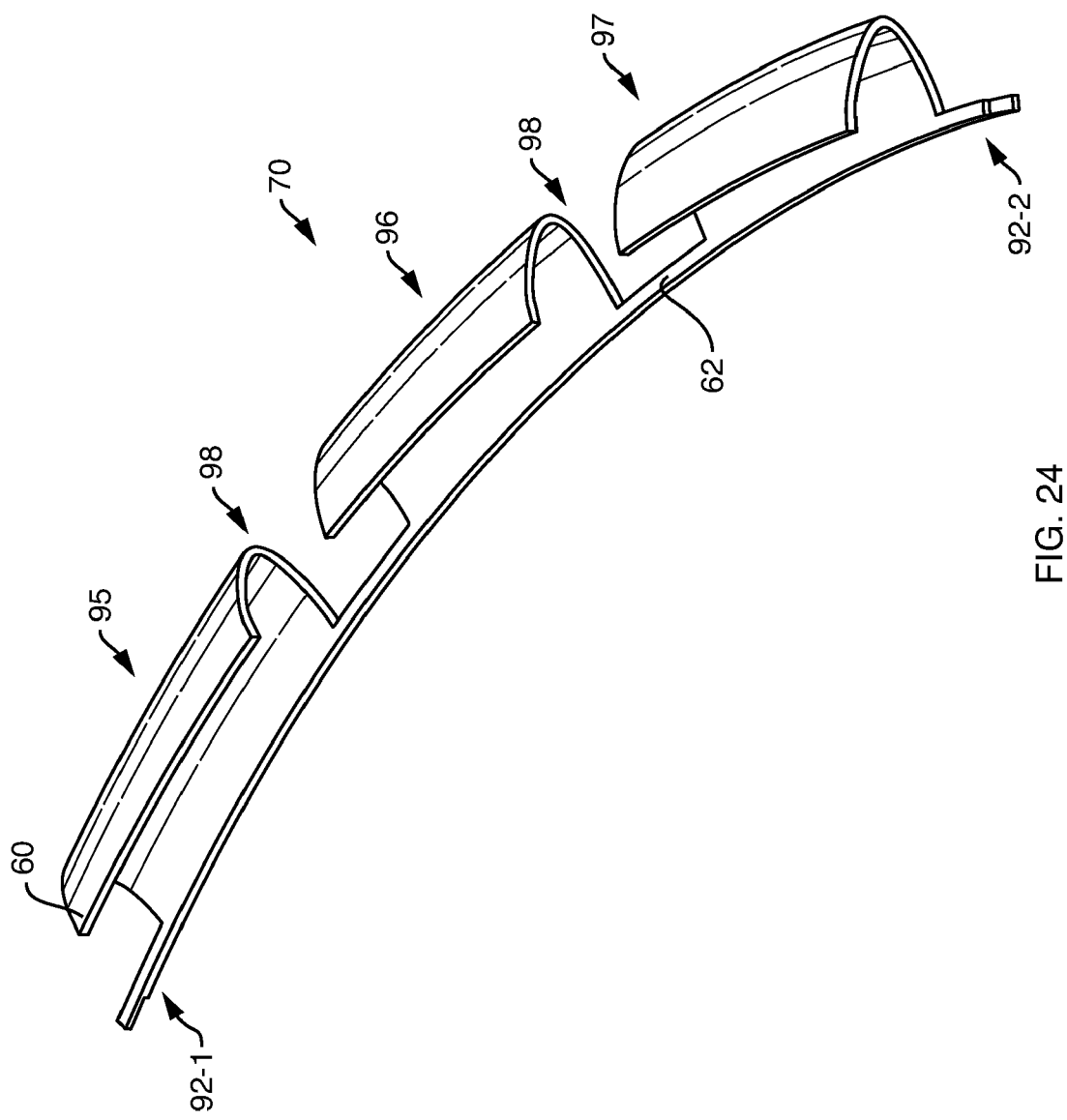
FIG. 24 illustrates another alternate arrangement of the spring member element of FIG. 20.
Figure 25:
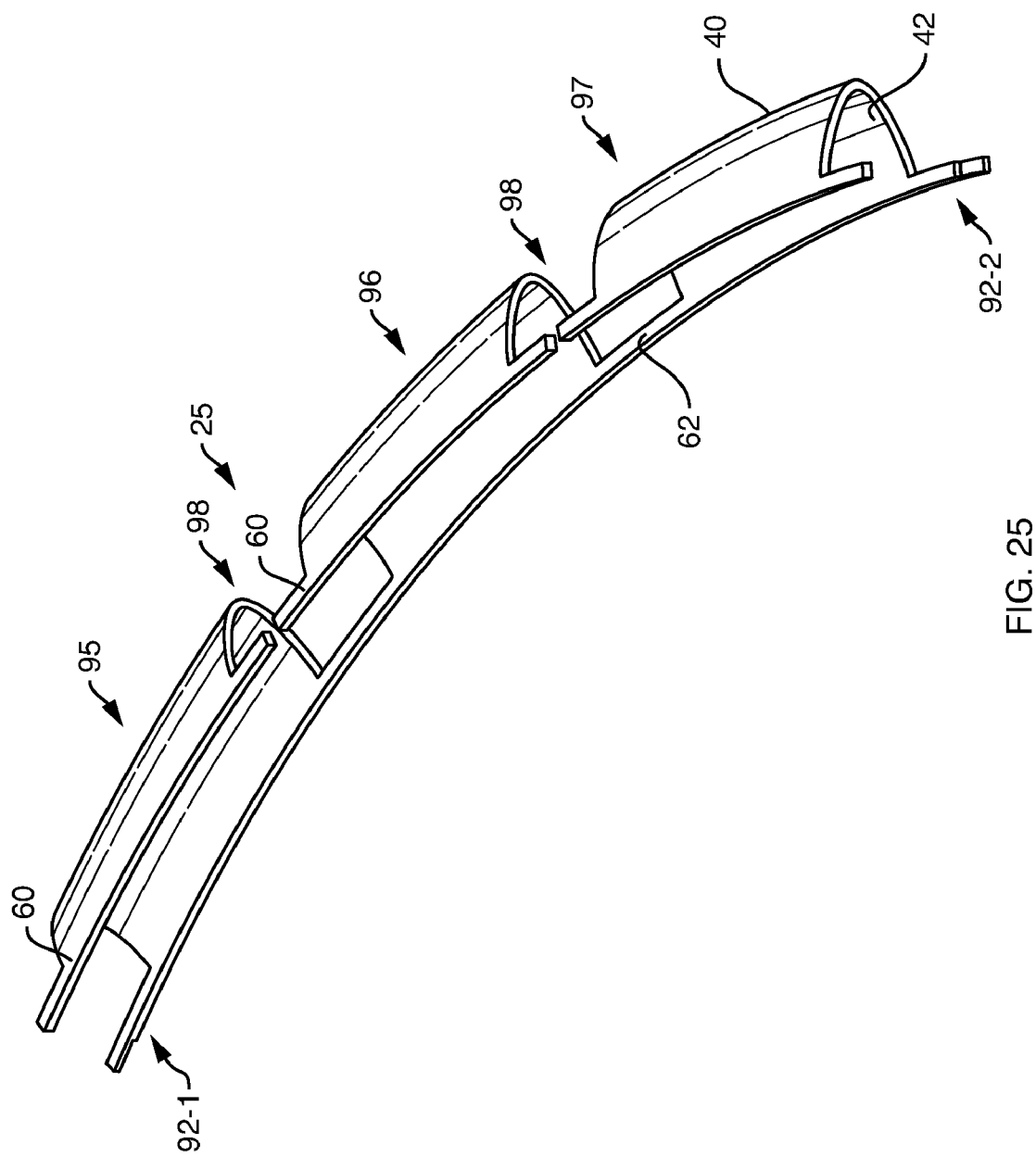
FIG. 25 illustrates another alternate arrangement of the spring member element of FIG. 20.

As indicated in FIGS. 20-22, the spring member element 70 includes a single pair of support elements, namely first and second support elements 40, 42. In one arrangement, as illustrated in FIGS. 23-25, the spring member element 70 includes multiple pairs of support elements. For example, as illustrated, each spring member element 70 includes three pairs of support elements 95, 96, 97 where the second sealing portions 62 of each of the three pairs of support elements 95, 96, 97 are integrally formed. Such a configuration reduces the number of spring element members 70 required to be joined together during the manufacturing process while minimizing the costs associated with machining the spring member 14' from a cast disk of single crystal alloy. Once arranged in a side-by-side manner, the manufacturer bends each spring element member 70 to a particular radius, joins the lap joints formed between adjacent spring member elements 70 to produce a spring member 14' and sheaths the spring member 14' in a jacket to produce a spring seal.

The first sealing portions 62 of each of the three pairs of support elements 95, 96, 97 can be configured in a variety of ways. For example, as illustrated in FIG. 23, the first sealing portions 62 are integrally formed. In other examples, as shown in FIGS. 24 and 25 the spring member element 70 defines gaps 98 between the first sealing portions 60 of adjacent support elements 95, 96, 97. The presence of gaps 98 first sealing portions 60 help to lower the spring rate and stresses in the first and second support elements 40, 42 as they are compressed between flanges 15a, 15b during use.

While various embodiments of the invention have been particularly shown and described, it will be understood by those skilled in the art that various changes in form and details may be made therein without departing from the spirit and scope of the invention as defined by the appended claims.

For example, as recited above, in order to cost effectively manufacture the spring member 14', spring member elements 70-1, 70-2, 70-N are cast as separate segments, arranged in a side-by-side manner, and joined together, such as by a brazing process, to create a spring member 14'. In one arrangement, the spring member 14' can be machined from a cast disk of single crystal alloy. In such an arrangement, the spring member 14' would not have to be disposed within a sheet metal jacket to produce the spring seal.

Also, the spring members 14 of the illustrative embodiments are not disclosed as being manufactured from ceramics because of ceramics general lack of toughness and propensity of brittle fracture. However, novel tougher ceramics or cermets having superior toughness, such as transformation toughened zirconia could be utilized for extremely high temperatures, such as greater than about 2000° F.

What is claimed is:

1. A seal compressible between a pair of mating surfaces, comprising:
    a jacket;
    a spring member disposed within the jacket, the spring member comprising a cast blade alloy, whereby the jacket is movable by the spring member to maintain a seal against at least one of the mating surfaces, the spring member including one or more flexible support elements, the support elements having at least one side which is inclined relative to a corresponding one of the mating surfaces;
    the single crystal cast blade alloy has a softer crystallographic direction and a harder crystallographic direction;
    a first support element of the one or more flexible support elements defines a length extending along a first direction relative to the jacket, the softer crystallographic direction of the single crystal cast blade alloy being substantially parallel to the length defined by the first support element; and
    a second support element of the one or more flexible support elements defines a length extending along a second direction relative to the jacket, the softer crystallographic direction of the single crystal cast blade alloy being substantially parallel to the length defined by the second support element;
    wherein the spring member comprises a plurality of separate spring member segments disposed in a side-by-side manner within and about a circumference of the jacket;
    the first support element of each spring member segment and the second support element of each spring member segment have a common fixed end;
    the first support element of each spring member segment is inclined at a first angle relative to the common fixed end, extends from an outer periphery of the jacket toward an inner periphery of the jacket, and defines a first free end opposing the common fixed end; and
    the second support element of each spring member segment is inclined at a second angle relative to the common fixed end, the second angle opposing the first angle, extends from the outer periphery of the jacket toward the inner periphery of the jacket, and defines a second free end opposing the common fixed end.

2. The seal of claim 1 comprising at least first and second support elements, the elements being spaced-apart to define a spacing therebetween.

3. The seal of claim 1 wherein the jacket has at least one side forming a generally continuous sealing surface against a corresponding one of the mating surfaces.

4. The seal of claim 1, wherein the spring member has a thickness of at least 0.02 inches.

5. A seal compressible between a pair of mating surfaces, comprising:
    a jacket having an outer periphery and an inner periphery; and
    a spring member disposed within the jacket, the spring member having a first support element inclined along a first direction relative to a longitudinal axis of the spring member and extending from the outer periphery of the jacket toward the inner periphery of the jacket and a second support element opposing the first support element, the second inclined along a second direction relative to the longitudinal axis of the spring member and extending from the outer periphery of the jacket toward the inner periphery of the jacket, the jacket being moveable by the at least one of the first support element and the second support element of the spring member to form a seal with at least one of the pair of mating surfaces;
    wherein the spring member comprises a cast blade alloy effective to cause at least one of the first support element and the second support element of the spring member to resist stress relaxation when the spring member is exposed to a temperature greater than about 1300° F.;
    wherein the spring member comprises a single crystal cast blade alloy having a softer crystallographic direction and a harder crystallographic direction;
    wherein the first support element defines a length extending along the first direction relative to the jacket, the softer crystallographic direction of the single crystal cast blade alloy being substantially parallel to the length defined by the first support element;
    wherein the second support element defines a length extending along the second direction relative to the jacket, the softer crystallographic direction of the single crystal cast blade alloy being substantially parallel to the length defined by the second support element;
    wherein the jacket comprises a first sealing dam extending about a first circumference of the inner periphery of the jacket;
    the spring member comprises a first sealing portion extending from the first support element and disposed within the first sealing dam, the first sealing portion providing a substantially continuous sealing force on the first sealing dam;
    wherein the jacket comprises a second sealing dam extending about a second circumference of the inner periphery of the jacket;
    the spring member comprises a second sealing portion extending from the second support element and disposed within the second sealing dam, the second sealing portion providing a substantially continuous sealing force on the second sealing dam; and
    wherein the spring member comprises a plurality of separate spring member segments disposed in a side-by-side manner within and about a circumference of the jacket.

6. The seal of claim 5, wherein the spring member defines a substantially U-shaped cross-section.

7. The seal of claim 5, wherein the spring member has a thickness of at least 0.02 inches.

8. The seal of claim 1, wherein:
    the first support element of each spring member segment comprises a first sealing portion disposed at the first free end of the first support element, the first support element extending along a longitudinal axis of the spring member segment and the first support element disposed within a first sealing dam extending about a first circumference portion of the inner periphery of the jacket; and the second support element of each spring member segment comprises a second sealing portion disposed at the second free end of the second support element, the second support element extending along the longitudinal axis of the spring member segment and the second support element disposed within a second sealing dam extending about a second circumference portion of the inner periphery of the jacket.

9. The seal of claim 8, wherein the second sealing portion of each spring member segment of the plurality of separate spring member segments is coupled to the second sealing portions of adjacent spring member segments.

10. The seal of claim 9, wherein the first sealing portion of each spring member segment of the plurality of separate spring member segments defines gaps with adjacent first sealing portions of adjacent spring member segments.

11. The seal of claim 10, wherein the gaps are between about 0.5 mm and 3.5 mm in width.

12. The seal of claim 5, wherein the second sealing portion of each spring member segment of the plurality of separate spring member segments is coupled to the second sealing portions of adjacent spring member segments.

13. The seal of claim 12, wherein the first sealing portion of each spring member segment of the plurality of separate spring member segments defines gaps with adjacent first sealing portions of adjacent spring member segments.

* * * * *